United States Patent
Duan

(10) Patent No.: US 12,351,167 B2
(45) Date of Patent: Jul. 8, 2025

(54) VEHICLE AND CONTROL DEVICE

(71) Applicant: PANASONIC INTELLECTUAL PROPERTY MANAGEMENT CO., LTD., Osaka (JP)

(72) Inventor: Jinsong Duan, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 239 days.

(21) Appl. No.: 18/203,937

(22) Filed: May 31, 2023

(65) Prior Publication Data

US 2023/0303067 A1  Sep. 28, 2023

Related U.S. Application Data

(63) Continuation of application No. PCT/JP2021/040184, filed on Oct. 29, 2021.

(30) Foreign Application Priority Data

Dec. 2, 2020 (JP) .................................. 2020-200523
Feb. 12, 2021 (JP) .................................. 2021-021156
Feb. 12, 2021 (JP) .................................. 2021-021157

(51) Int. Cl.
*B60W 30/09* (2012.01)
*B60W 30/095* (2012.01)

(52) U.S. Cl.
CPC .......... *B60W 30/09* (2013.01); *B60W 30/095* (2013.01); *B60W 2554/4041* (2020.02); *B60W 2556/65* (2020.02)

(58) Field of Classification Search
CPC .............. B60W 30/09; B60W 30/095; B60W 2554/4041; B60W 2556/65; B60W 30/0956; G08G 1/16
See application file for complete search history.

(56) References Cited

U.S. PATENT DOCUMENTS 11,180,159 B1* 11/2021 Post .................... G08G 1/04
2007/0279250 A1   12/2007 Kume et al.
(Continued)

FOREIGN PATENT DOCUMENTS

DE    102015200703 A1 *  7/2016
JP    2005-242552 A       9/2005
(Continued)

OTHER PUBLICATIONS

Office Action issued in Japan Counterpart Patent Appl. No. 2020-200523, dated Jul. 26, 2022.
(Continued)

*Primary Examiner* — Daniel M. Robert
(74) *Attorney, Agent, or Firm* — GREENBLUM & BERNSTEIN, P.L.C.

(57) ABSTRACT

A vehicle include a first wheel and a second wheel, a steering circuit configured to steer at least one of the first wheel and the second wheel, and a wireless communication circuit configured to wirelessly communicate with the first vehicle and the second vehicle. When the wireless communication circuit receives a scheduled route of the first vehicle from the first vehicle while the vehicle is traveling on a first scheduled route, and determines that a possibility of a collision with the first vehicle is equal to or greater than a certain value based on the first scheduled route and the scheduled route of the first vehicle. The vehicle creates a second scheduled route different from the first scheduled route, starts traveling on the second scheduled route, and transmits the scheduled route of the first vehicle and the second scheduled route to the second vehicle.

20 Claims, 31 Drawing Sheets

(56) References Cited

U.S. PATENT DOCUMENTS

| | | | |
|---|---|---|---|
| 2011/0210866 A1* | 9/2011 | David | G08G 1/166 |
| | | | 340/901 |
| 2013/0181850 A1 | 7/2013 | Emura et al. | |
| 2017/0168503 A1 | 6/2017 | Amla et al. | |
| 2017/0369067 A1* | 12/2017 | Saigusa | B60W 30/16 |
| 2018/0239362 A1 | 8/2018 | Amla et al. | |
| 2018/0261095 A1* | 9/2018 | Qiu | G01S 17/86 |
| 2019/0011910 A1 | 1/2019 | Lockwood et al. | |
| 2019/0011912 A1 | 1/2019 | Lockwood et al. | |
| 2019/0080182 A1 | 3/2019 | Oe et al. | |
| 2019/0114921 A1* | 4/2019 | Cazzoli | G06V 20/58 |
| 2019/0156129 A1 | 5/2019 | Kakegawa et al. | |
| 2019/0180629 A1 | 6/2019 | Kim | |
| 2019/0193727 A1* | 6/2019 | Noda | G08G 1/167 |
| 2019/0291727 A1* | 9/2019 | Shalev-Shwartz | G08G 1/163 |
| 2020/0023842 A1* | 1/2020 | Gutierrez | G06V 20/58 |
| 2020/0090514 A1 | 3/2020 | Sakaguchi et al. | |
| 2020/0225659 A1 | 7/2020 | Lockwood et al. | |
| 2021/0216082 A1 | 7/2021 | Amla et al. | |
| 2021/0370921 A1* | 12/2021 | Silva | B60W 60/0027 |
| 2022/0260994 A1 | 8/2022 | Lockwood et al. | |
| 2023/0303067 A1* | 9/2023 | Duan | G08G 1/16 |

FOREIGN PATENT DOCUMENTS

| | | |
|---|---|---|
| JP | 2005-250666 A | 9/2005 |
| JP | 2007-264884 A | 10/2007 |
| JP | 2007-298341 A | 11/2007 |
| JP | 2007-318387 A | 12/2007 |
| JP | 2007-323556 A | 12/2007 |
| JP | 2008-176459 A | 7/2008 |
| JP | 2008-299676 A | 12/2008 |
| JP | 2009-193135 A | 8/2009 |
| JP | 2011-209171 A | 10/2011 |
| JP | 2012-079105 A | 4/2012 |
| JP | 2017-224026 A | 12/2017 |
| JP | 2018-018467 A | 2/2018 |
| JP | 2018-148284 A | 9/2018 |
| JP | 2019-503022 A | 1/2019 |
| JP | 2019-053438 A | 4/2019 |
| JP | 2020-068499 A | 4/2020 |
| JP | 2020-526832 A | 8/2020 |
| KR | 10-2010-0070163 A | 6/2010 |
| WO | 2018/016394 | 1/2018 |
| WO | 2019/012629 | 1/2019 |

OTHER PUBLICATIONS

Office Action issued in Japan Counterpart Patent Appl. No. 2021-021157, dated Jan. 4, 2023.

International Search Report issued in International Bureau of WIPO Patent Application No. PCT/JP2021/040184, dated Dec. 21, 2021, along with an English translation thereof.

* cited by examiner

FIG. 3

DATA FORMAT OF V2X COMMUNICATION

| INDEX | DATA ITEM |
|---|---|
| 1 | AVOIDANCE SCHEDULE FLAG |
| 2 | SCHEDULED ROUTE |
| 3 | PRECISE POSITION (VEHICLE CONTOUR INFORMATION) |
| 4 | VEHICLE TYPE AND SIZE |

FIG. 16

V2X COMMUNICATION FORMAT OF BLIND SPOT REGION INFORMATION SET

| INDEX | | ITEM | EXAMPLE | UNIT |
|---|---|---|---|---|
| FIRST BLIND SPOT REGION INFORMATION | | BLIND SPOT ANGLE | 30 DEGREES | DEGREE |
| | | BLIND SPOT ANGLE REFERENCE DIRECTION | 30 DEGREES SOUTHWEST | DEGREE |
| | | DEPTH DISTANCE RANGE OF BLIND SPOT | 3m~50m | m |
| | | TRAVELING DIRECTION | 45 DEGREES SOUTHWEST | DEGREE |
| | | POSITION | LONGITUDE, LATITUDE, AND ALTITUDE | LONGITUDE, LATITUDE, AND ALTITUDE |
| | | OBSTACLE DISTANCE | 20m | m |
| | | SPEED | 10km/h | km/h |
| SECOND BLIND SPOT REGION INFORMATION | | BLIND SPOT ANGLE | 15 DEGREES | DEGREE |
| | | BLIND SPOT ANGLE REFERENCE DIRECTION | 15 DEGREES SOUTHWEST | DEGREE |
| | | DEPTH DISTANCE RANGE OF BLIND SPOT | 3m~50m | m |
| | | TRAVELING DIRECTION | 45 DEGREES SOUTHWEST | DEGREE |
| | | POSITION | LONGITUDE, LATITUDE, AND ALTITUDE | LONGITUDE, LATITUDE, AND ALTITUDE |
| | | OBSTACLE DISTANCE | 30m | m |
| | | SPEED | 10km/h | km/h |
| ... | | ... | ... | ... |

FIG. 17

V2X COMMUNICATION FORMAT OF MOVING OBJECT POSITION INFORMATION

| INDEX | ITEM | EXAMPLE | UNIT |
|---|---|---|---|
| 1 | POSITION | LONGITUDE, LATITUDE, AND ALTITUDE | LONGITUDE, LATITUDE, AND ALTITUDE |
| 2 | TRAVELING DIRECTION | 45 DEGREES SOUTHWEST | DEGREE |
| 3 | SPEED | 10km/h | km/h |
| 4 | V2X COMMUNICATION TERMINAL ID OF VEHICLE AS TRANSMISSION SOURCE OF BLIND SPOT REGION INFORMATION | 1 | NONE |
| ... | ... | ... | ... |

FIG. 18

V2X COMMUNICATION FORMAT OF BROADCAST POSITION INFORMATION

| INDEX | ITEM | EXAMPLE | UNIT |
|---|---|---|---|
| 1 | POSITION | LONGITUDE, LATITUDE, AND ALTITUDE | LONGITUDE, LATITUDE, AND ALTITUDE |
| 2 | TRAVELING DIRECTION | 45 DEGREES SOUTHWEST | DEGREE |
| 3 | SPEED | 10km/h | km/h |
| ... | ... | ... | ... |

FIG. 26

V2X COMMUNICATION FORMAT OF VEHICLE POSITION INFORMATION

| INDEX | ITEM | EXAMPLE | UNIT |
|---|---|---|---|
| 1 | POSITION | LONGITUDE, LATITUDE, AND ALTITUDE | LONGITUDE, LATITUDE, AND ALTITUDE |
| 2 | TRAVELING DIRECTION OF VEHICLE | 45 DEGREES SOUTHWEST | DEGREE |
| 3 | SPEED OF VEHICLE | 10km/h | km/h |
| 4 | V2X COMMUNICATION TERMINAL ID | 1 | NONE |
| ... | ... | ... | ... |

FIG. 27

V2X COMMUNICATION FORMAT OF DYNAMIC MAP INFORMATION

| INDEX | ITEM | EXAMPLE | UNIT |
|---|---|---|---|
| FIRST BLIND SPOT AREA INFORMATION | BLIND SPOT FLAG = 0 or 1 | 0: VEHICLE THAT IS TRANSMISSION SOURCE IS NOT IN BLIND SPOT AREA<br>1: VEHICLE THAT IS TRANSMISSION SOURCE IS IN BLIND SPOT AREA | |
| | POSITION INFORMATION INDICATING BLIND SPOT AREA | POSITIONS (LONGITUDE, LATITUDE, AND ALTITUDE) OF VERTICES A, B, C, AND D | LONGITUDE, LATITUDE, AND ALTITUDE |
| SECOND BLIND SPOT AREA INFORMATION | BLIND SPOT FLAG | 0: VEHICLE THAT IS TRANSMISSION SOURCE IS NOT IN BLIND SPOT AREA<br>1: VEHICLE THAT IS TRANSMISSION SOURCE IS IN BLIND SPOT AREA | |
| | POSITION INFORMATION INDICATING BLIND SPOT AREA | POSITIONS (LONGITUDE, LATITUDE, AND ALTITUDE) OF VERTICES A, B, C, AND D | LONGITUDE, LATITUDE, AND ALTITUDE |
| FIRST ROAD INFORMATION | ROAD INFORMATION | ROAD DIRECTION, ROAD WIDTH, ONE-WAY TRAFFIC, OR THE LIKE | |
| ... | ... | ... | ... |
| FIRST INTERSECTION INFORMATION | INTERSECTION INFORMATION | | ... |
| DANGER FLAG | DANGER FLAG = 0 or 1 | 0: LESS DANGEROUS<br>1: DANGEROUS (VERY NARROW ROAD, DEAD END, OR ENTRANCE-FORBIDDEN AREA) | |

FIG. 28

V2X COMMUNICATION FORMAT OF MOVING OBJECT POSITION INFORMATION

| INDEX | ITEM | EXAMPLE | UNIT |
|---|---|---|---|
| 1 | POSITION | LONGITUDE, LATITUDE, AND ALTITUDE | LONGITUDE, LATITUDE, AND ALTITUDE |
| 2 | TRAVELING DIRECTION | 45 DEGREES SOUTHWEST | DEGREE |
| 3 | SPEED | 4km/h | km/h |
| 4 | V2X COMMUNICATION TERMINAL ID | 1 | |
| ... | ... | ... | ... |

FIG. 29

V2X COMMUNICATION FORMAT OF BROADCAST POSITION INFORMATION

| INDEX | ITEM | EXAMPLE | UNIT |
|---|---|---|---|
| 1 | POSITION | LONGITUDE, LATITUDE, AND ALTITUDE | LONGITUDE, LATITUDE, AND ALTITUDE |
| 2 | TRAVELING DIRECTION | 45 DEGREES SOUTHWEST | DEGREE |
| 3 | SPEED | 10km/h | km/h |
| ... | ... | ... | ... |

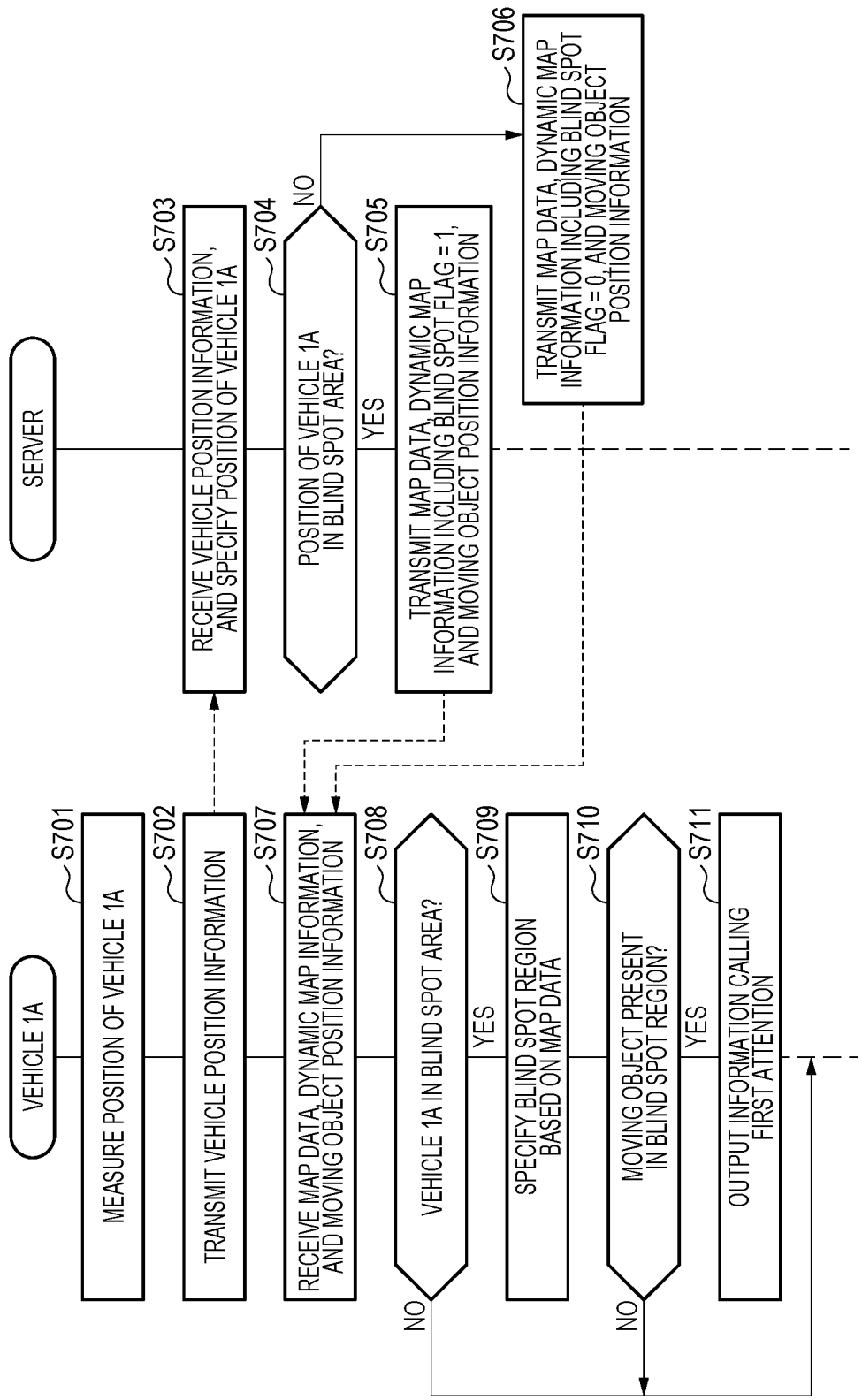

VEHICLE AND CONTROL DEVICE

CROSS-REFERENCE TO RELATED APPLICATIONS

This is a continuation of International Application No. PCT/JP2021/040184 filed on Oct. 29, 2021, and claims priority from Japanese Patent Application No. 2020-200523 filed on Dec. 2, 2020, Japanese Patent Application No. 2021-21156 filed on Feb. 12, 2021, and Japanese Patent Application No. 2021-21157 filed on Feb. 12, 2021, the entire content of which are incorporated herein by reference.

TECHNICAL FIELD

The present disclosure relates to a vehicle and a control device.

BACKGROUND ART

For a driver of a vehicle, the other side of other vehicles, or other obstacles such as buildings along a road or walls is a blind spot that cannot be visually recognized. When other vehicles, pedestrians, or the like present in the blind spot suddenly appears, the driver cannot cope with a situation and may lead to an accident. Therefore, a technology for detecting the other vehicles, the pedestrians, or the like present on positions around the vehicle of the driver, including the blind spot, has been developed (Patent Literatures 1, 2, and 3).

CITATION LIST

Patent Literature

Patent Literature 1: JP2018-18467A
Patent Literature 2: JP2020-68499A
Patent Literature 3: WO2018/016394

SUMMARY OF INVENTION

Technical Problem

However, if the driver is alerted every time the other vehicles or the pedestrians around the vehicle of the driver are detected, the driver becomes accustomed to the alert, and an effect of the alert is reduced.

An object of the present disclosure is to provide a vehicle and a control device capable of calling attention of a driver with appropriate intensity.

Solution to Problem

A vehicle according to an aspect of the present disclosure is a vehicle including a first wheel and a second wheel and movable in a predetermined direction using the first wheel and the second wheel. The vehicle includes: a position detection circuit configured to detect a first position of the vehicle; a wireless communication circuit configured to receive a second position of a moving object; an imaging circuit configured to acquire a captured image of an outside of the vehicle; and an output circuit configured to output information calling attention, a region that is a blind spot due to an obstacle is set as a blind spot region from a size of the obstacle detected from the captured image and a relative position between the obstacle and the vehicle with respect to the first position, when the second position is in the blind spot region, the output circuit outputs information calling first attention, when the second position is not in the blind spot region, the output circuit outputs information calling second attention, and first intensity for calling the attention to the information calling the first attention is stronger than second intensity for calling the attention to the information calling the second attention.

A control device according to an aspect of the present disclosure is a control device configured to be mounted on a vehicle including a first wheel and a second wheel, movable in a predetermined direction using the first wheel and the second wheel, and further including a position detection circuit configured to detect a first position of the vehicle, a wireless communication circuit configured to receive a second position of a moving object, an imaging circuit configured to acquire a captured image of an outside of the vehicle, and an output circuit configured to output information calling attention. A region that is a blind spot due to an obstacle is set as a blind spot region from a size of the obstacle detected from the captured image and a relative position between the obstacle and the vehicle with respect to the first position, when the second position is in the blind spot region, the output circuit outputs information calling first attention, when the second position is not in the blind spot region, the output circuit outputs information calling second attention, and first intensity for calling the attention to the information calling the first attention is stronger than second intensity for calling the attention to the information calling the second attention.

These comprehensive or specific aspects may be implemented by a system, a device, a method, an integrated circuit, a computer program, or a recording medium, or any combination of the system, the device, the method, the integrated circuit, the computer program, and the recording medium.

Advantageous Effects of Invention

According to the present disclosure, it is possible to call attention of a driver with appropriate intensity.

BRIEF DESCRIPTION OF DRAWINGS

FIG. 3 is a diagram showing an example of a data format of V2X communication between vehicles according to the first embodiment;

FIG. 16 is a diagram showing an example of a V2X communication format of a blind spot region information set according to the second embodiment;

FIG. 17 is a diagram showing an example of a V2X communication format of moving object position information according to the second embodiment;

FIG. 18 is a diagram showing an example of a V2X communication format of broadcast position information according to the second embodiment;

FIG. 26 is a diagram showing an example of a V2X communication format of vehicle position information according to the third embodiment;

FIG. 27 is a diagram showing an example of a V2X communication format of dynamic map information according to the third embodiment;

FIG. 28 is a diagram showing an example of a V2X communication format of moving object position information according to the third embodiment;

FIG. 29 is a diagram showing an example of a V2X communication format of broadcast position information according to the third embodiment;

FIG. 31 is a flowchart showing an example of a process in a case in which the server determines whether the vehicle 1A according to the third embodiment is in the blind spot area.

DESCRIPTION OF EMBODIMENTS

Hereinafter, embodiments of the present disclosure will be described in detail with reference to the drawings as appropriate. However, the unnecessarily detailed description may be omitted. For example, the detailed description of already well-known matters and the repeated description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

First Embodiment

<Configuration of Vehicle>

Figure 1:
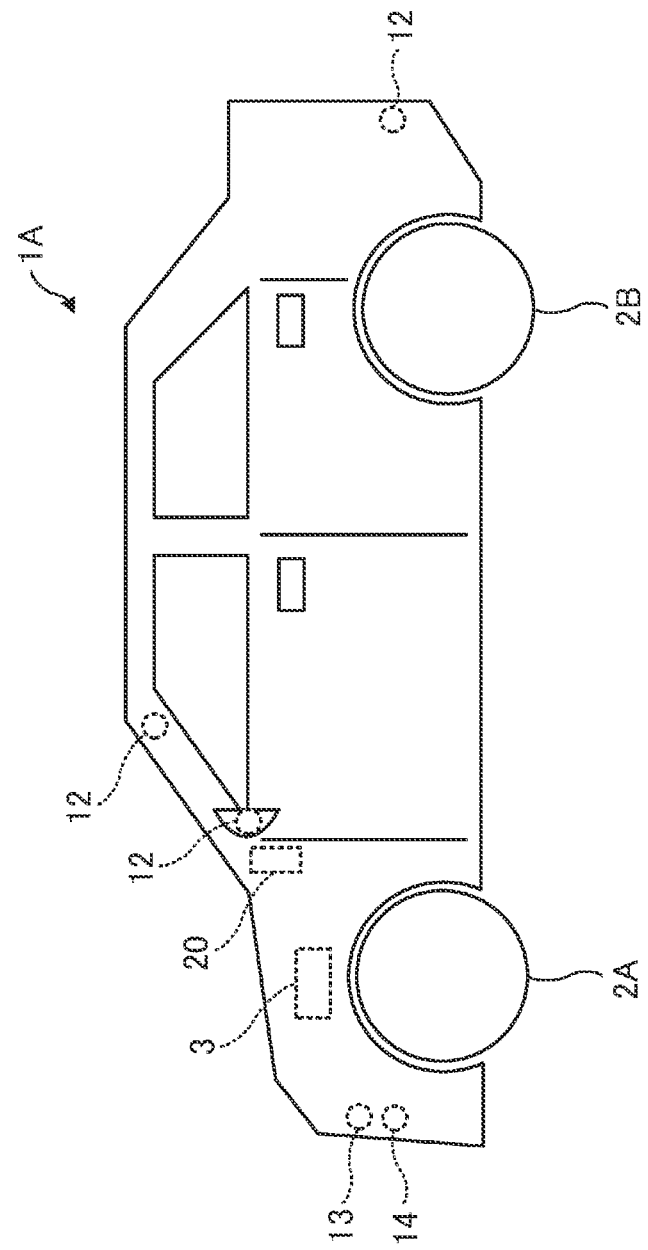
FIG. 1 is a schematic diagram showing an example of a configuration of a vehicle 1A according to a first embodiment.
Figure 2:
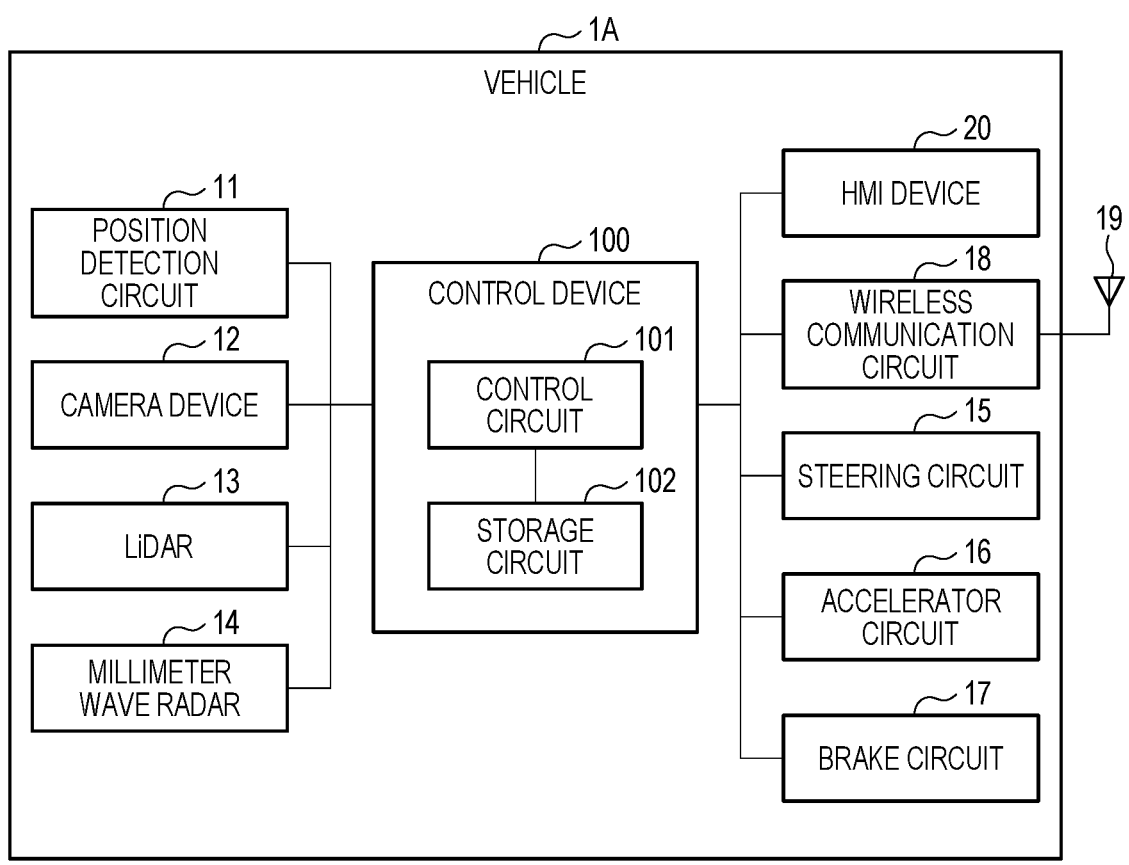
FIG. 2 is a block diagram showing an example of a configuration of devices provided in the vehicle 1A according to the first embodiment.

FIG. 1 is a schematic diagram showing an example of a configuration of a vehicle 1A according to a first embodiment. FIG. 2 is a block diagram showing an example of a configuration of devices provided in the vehicle 1A according to the first embodiment. A vehicle 1B, a vehicle 1C, and the like to be described later may have the same configuration as that of the vehicle 1A illustrated in FIGS. 1 and 2.

The vehicle 1A includes a drive portion 3 such as an engine or a motor, and at least a first wheels 2A and a second wheels 2B. The vehicle 1A can travel by the drive portion 3 rotationally driving at least one of the first wheels 2A and the second wheels 2B. When the vehicle 1A includes four wheels, the first wheels 2A may be front wheels, and the second wheels 2B may be rear wheels. However, the vehicle 1A is not limited to the case of including four wheels, and may include one to three wheels or five or more wheels.

The vehicle 1A may include advanced driver-assistance systems (ADAS). Alternatively, the vehicle 1A may have an autonomous driving function. An autonomous driving level of the autonomous driving function of the vehicle 1A may be any one of level 0 to level 5. Alternatively, the vehicle 1A may include both the ADAS and the autonomous driving function, or may not include both of the ADAS and the autonomous driving function.

The vehicle 1A includes a position detection circuit 11, camera devices 12, a laser imaging detection and ranging (LiDAR) 13, a millimeter wave radar 14, a steering circuit 15, an accelerator circuit 16, a brake circuit 17, a wireless communication circuit 18, a control device 100, and a human machine interface (HMI) device 20. These devices 11 to 18, 20, and 100 may be configured as one or a plurality of electronic control units (ECU). Further, these devices 11 to 18, 20, and 100 may transmit and receive information to and from one another through a communication network provided in the vehicle 1A. Examples of the communication network provided in the vehicle 1A include a controller area network (CAN), LIN, and FlexRay.

The position detection circuit 11 can acquire position information of the vehicle 1A. For example, the position detection circuit 11 measures a position of the vehicle 1A using a global navigation satellite system (GNSS), and acquires the position information indicating the measured position of the vehicle 1A. The position information may include a measured time point and longitude and latitude measured at the time point.

The camera device 12 captures an image of surroundings of the vehicle 1A and generates a surrounding image. The surrounding image may be either a still image or a moving image. As illustrated in FIG. 1, the vehicle 1A may include a plurality of camera devices 12, and may generate a surrounding image by deforming and synthesizing captured images of the camera devices 12. Alternatively, the vehicle 1A may include a camera device 12 capable of capturing an omnidirectional image, and may generate a surrounding image by deforming the captured image of the camera device 12. The surrounding image generated by the camera device 12 may be used for detecting objects present around the vehicle 1A. Examples of the objects (obstacles) present around the vehicle 1A include other vehicles, pedestrians, bicycles, and installed objects.

The LiDAR 13 is a device that detects the objects present around the vehicle 1A by irradiating the surroundings of the vehicle 1A with laser light and measuring reflected light thereof.

The millimeter wave radar 14 is a device that detects the objects present around the vehicle 1A by irradiating the surroundings of the vehicle 1A with millimeter waves and measuring reflected waves thereof.

The vehicle 1A may detect the objects present around the vehicle 1A by using the camera device 12, the LiDAR 13, and the millimeter wave radar 14 in a complementary manner. Alternatively, the vehicle 1A may include at least one of the camera device 12, the LiDAR 13, and the millimeter wave radar 14, and may detect the objects present around the vehicle 1A using information obtained from at least one of the camera device 12, the LiDAR 13, and the millimeter wave radar 14. As described above, since the camera device 12, the LiDAR 13, and the millimeter wave radar 14 are examples of devices used for detecting the objects, these devices may be replaced with object detection devices.

The steering circuit 15 is a circuit capable of steering at least one of the first wheels 2A and the second wheels 2B provided in the vehicle 1A. For example, the steering circuit 15 controls steering of the first wheels 2A (front wheels) to control a direction in which the vehicle 1A curves (for example, curves to the right or curves to the left).

The accelerator circuit 16 is a circuit that controls an accelerator to control acceleration and deceleration of the vehicle 1A. When the vehicle 1A is steered by the driver, the accelerator circuit 16 may control the acceleration and deceleration of the vehicle 1A in accordance with an accelerator operation performed by the driver. When the vehicle 1A is steered by the ADAS or the autonomous driving function, the accelerator circuit 16 may control the acceleration and deceleration of the vehicle 1A in accordance with an instruction from the control device 100.

The brake circuit 17 is a circuit that controls the deceleration and stopping of the vehicle 1A by controlling a brake. When the vehicle 1A is steered by the driver, the brake circuit 17 may control the deceleration and stopping of the vehicle in accordance with a brake operation performed by the driver. When the vehicle 1A is steered by the ADAS or the autonomous driving function, the brake circuit 17 may control the deceleration and stopping of the vehicle 1A in accordance with the instruction from the control device 100.

The wireless communication circuit 18 is a circuit capable of performing wireless communication with other vehicle 1B and the vehicle 1C (see FIGS. 5, 7, and 9) through an antenna 19. The vehicle 1B may be replaced with a first vehicle, and the vehicle 1C may be replaced with a second vehicle. The wireless communication circuit 18 may be a circuit capable of V2X communication. The wireless communication circuit 18 may broadcast, to the surroundings of the vehicle 1A, information for transmission via the antenna 19 as the V2X communication. Further, the V2X communication may be any of a vehicle to vehicle (V2V) communication, a vehicle to pedestrian (V2P) communication, a vehicle to infrastructure (V2I) communication, and a vehicle to network (V2N) communication. Examples of a V2X communication scheme include dedicated short range communications (DSRC) and cellular-V2x (C-V2X). The V2X communication scheme may correspond to 4G or 5G.

The control device 100 is a device that controls a behavior of the vehicle 1A. The number of the control devices 100 mounted on the vehicle 1A is not limited to one, and may be two or more. The control device 100 may include a control circuit 101. The control circuit 101 may be replaced with other terms such as a central processing unit (CPU), a processor, a controller, and an arithmetic circuit. A storage circuit 102 may be connected to the control circuit 101. The storage circuit 102 may be configured as a read-only memory (ROM), a random access memory (RAM), a flash memory, or a combination thereof. The control circuit 101 may implement functions of the vehicle 1A and the control device 100 according to the first embodiment by reading and executing data and a computer program recorded in the storage circuit 102. The functions of the vehicle 1A and the control device 100 according to the first embodiment are not limited to being achieved by one control circuit 101, and may be achieved by cooperation of the plurality of control circuits 101.

The control circuit 101 may achieve driving assistance or autonomous driving of the vehicle 1A based on the information received from at least one of the position detection circuit 11, the camera device 12, the LiDAR 13, and the millimeter wave radar 14.

The control circuit 101 controls a steering direction, a traveling speed, a start, a stop, and the like of the vehicle 1A through the steering circuit 15, the accelerator circuit 16, and the brake circuit 17, and causes the vehicle 1A to travel in accordance with a set scheduled route. Therefore, information indicating the scheduled route is information indicating a route (trajectory) in which the vehicle 1A will travel in the future, and may include, for example, at least one piece of position information indicating a current position and a future position of the vehicle 1A and at least one piece of direction information indicating a current direction and a future direction of the vehicle 1A. Similarly, information indicating a first scheduled route 201 and a second scheduled route 202 (see FIGS. 5, 7, and 9) to be described later may also include at least one piece of position information indicating the current position and the future position of the vehicle 1A and at least one piece of direction information indicating the current direction and the future direction of the vehicle 1A.

For example, when the first scheduled route 201 is set, the control circuit 101 of the vehicle 1A causes the vehicle 1A to travel along the first scheduled route 201. When the wireless communication circuit 18 receives a scheduled route 200 (see FIGS. 5, 7, and 9) of the vehicle 1B (first vehicle) from the vehicle 1B while the vehicle 1A is traveling on the first scheduled route 201 and determines that a possibility of collision with the vehicle 1B is equal to or greater than a certain value based on the first scheduled route 201 and the scheduled route 200 of the vehicle 1B, the vehicle 1A creates the second scheduled route 202 different from the first scheduled route 201, starts traveling on the second scheduled route 202, and transmits the scheduled route 200 of the vehicle 1B and the second scheduled route 202 to the other vehicle 1C.

The vehicle 1C that has received the scheduled route 200 of the vehicle 1B and the second scheduled route 202 may perform control based on the scheduled route 200 of the vehicle 1B and the second scheduled route 202.

Here, when the possibility of the collision between the vehicle 1A and the vehicle 1B determined based on the first scheduled route 201 and the scheduled route 200 of the vehicle 1B is set as a first possibility, a possibility of the collision between the vehicle 1A and the vehicle 1B based on the second scheduled route 202 and the scheduled route 200 of the vehicle 1B is set as a second possibility, and the second possibility may be lower than the first possibility. That is, the vehicle 1A may be less likely to collide with the vehicle 1B when traveling along the second scheduled route 202 than along the first scheduled route 201. In other words, the second scheduled route 202 may be a route that allows the vehicle 1A to avoid the collision with the vehicle 1B. Therefore, the second scheduled route 202 may be replaced with a scheduled route for avoidance.

The HMI device 20 is a device that provides information related to ADAS and/or autonomous driving to the driver or an occupant of the vehicle 1A. The HMI device 20 may include a display device (for example, a head-up display device). In this case, the HMI device may display the information (image) indicating the first scheduled route 201 or the second scheduled route 202 described above on a display device.

FIG. 3 is a diagram showing an example of a data format of the V2X communication between vehicles according to the first embodiment. In the first embodiment, information transmitted in the V2X communication using the data format illustrated in FIG. 3 is referred to as V2X information. In a description of FIG. 3, a case in which the vehicle 1B transmits the V2X information will be described, and the same applies to a case in which the vehicle 1A or the vehicle 1C transmits the V2X information.

As illustrated in FIG. 2, the V2X information may include, as data items, an avoidance schedule flag, a scheduled route, a precise position, and a vehicle type and size.

The avoidance schedule flag stores a flag indicating which of the first scheduled route 201 and the second scheduled route 202 is stored in the data item "scheduled route" of the V2X information. For example, an avoidance schedule flag "0" indicates that the first scheduled route 201 is stored in the data item "scheduled route" of the V2X communication, and the avoidance schedule flag "1" indicates that the second scheduled route 202 is stored in the data item "scheduled route" of the V2X communication.

The information indicating the scheduled route of the vehicle 1B that transmits the V2X information is stored in the scheduled route. For example, the first scheduled route 201 or the second scheduled route 202 is stored in the scheduled route. The scheduled route may include, for example, information indicating a future travel trajectory of a vehicle such as travel, a left turn, a right turn, and an avoidance curve of the vehicle 1B.

Information indicating a precise position of the vehicle 1B that transmits the V2X information is stored in the precise position. For example, information indicating a contour of the vehicle 1B (hereinafter referred to as vehicle contour information) is stored in the precise position. As illustrated in FIGS. 5 to 9, the vehicle contour information may be information indicating positions of four vertices of a rectangle including the vehicle 1B as viewed from above.

Information indicating a type or a size of the vehicle 1B that transmits the V2X communication is stored in the vehicle type and size. For example, when the vehicle 1B is a passenger car, information indicating the "passenger car" is stored in the vehicle type and size. Information such as "truck" and "bus" may be stored in the vehicle type and size.

<Process Executed by Vehicle>

Figure 4:
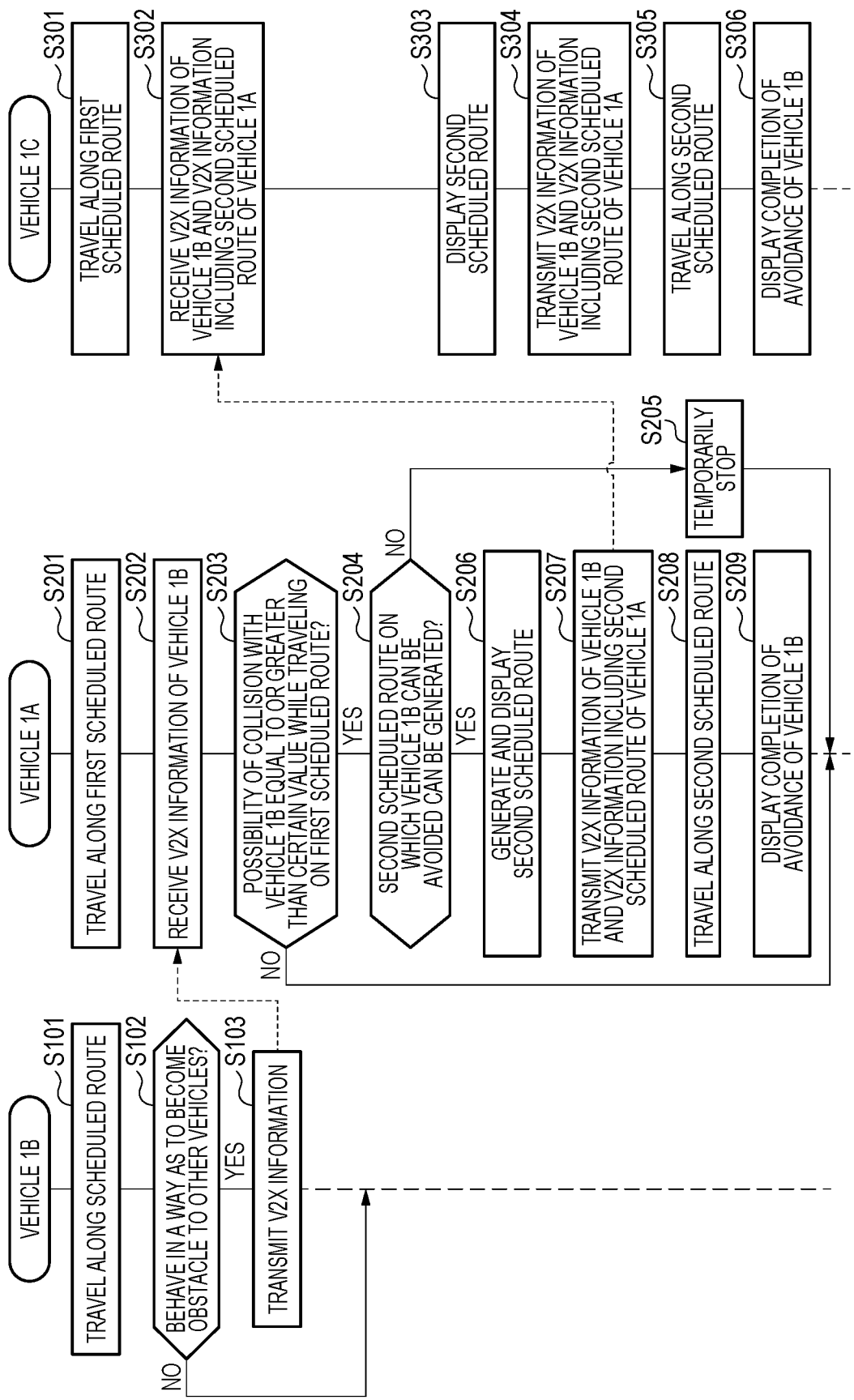
FIG. 4 is a flowchart showing an example of a process executed by vehicles 1A, 1B, and 1C according to the first embodiment.

FIG. 4 is a flowchart illustrating an example of a process executed by the vehicles 1A, 1B, and 1C according to the first embodiment. The vehicles 1A, 1B, and 1C may repeatedly execute the process illustrated in FIG. 4. In a description of FIG. 4, a process mainly performed by the vehicles 1A, 1B, and 1C may be replaced with a process mainly performed by the control device 100 or the control circuit 101 provided in the vehicles 1A, 1B, and 1C.

Figure 5:
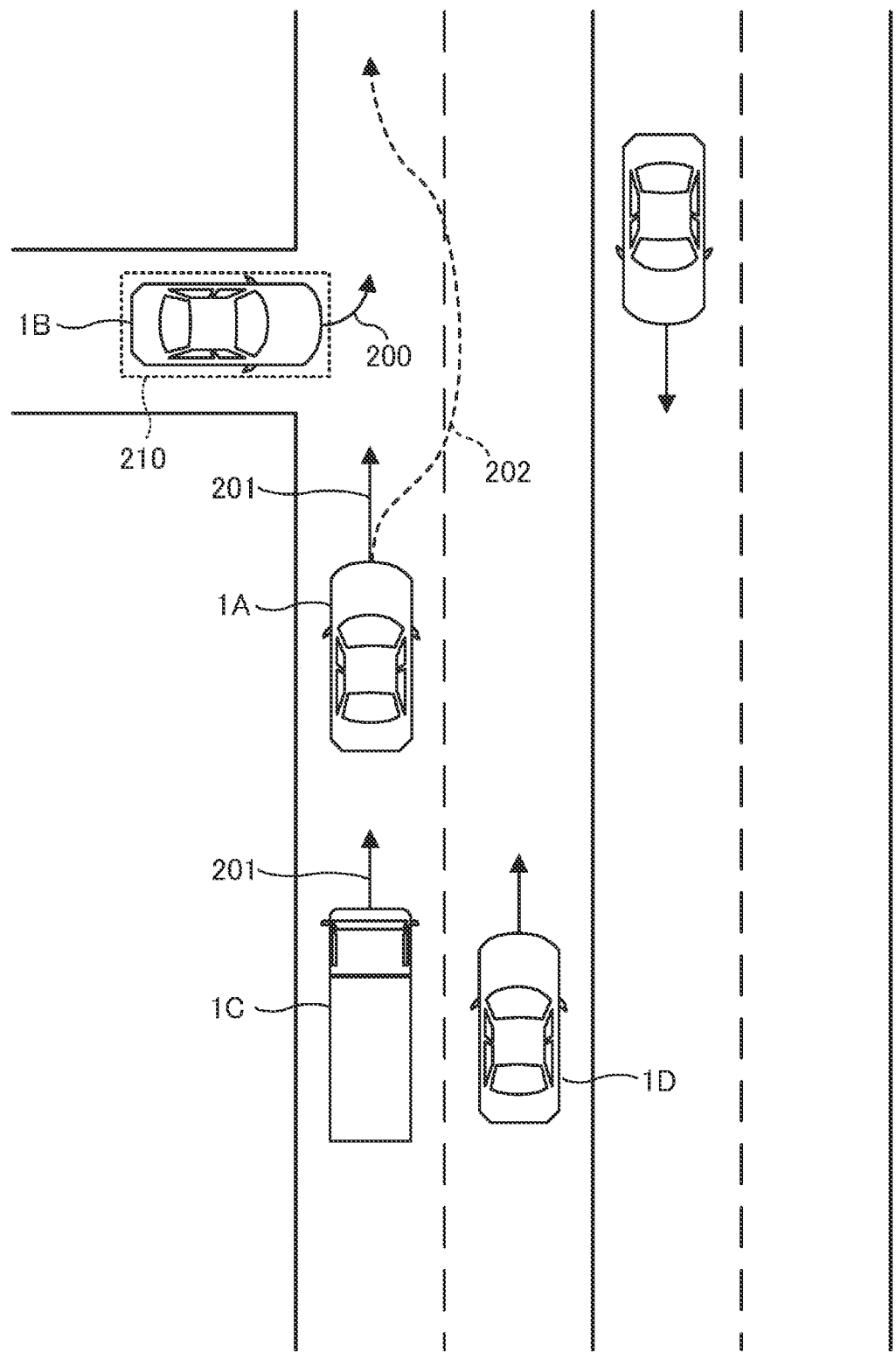
FIG. 5 is a diagram illustrating an example in which the vehicle 1A avoids the vehicle 1B advancing from a side road to an arterial road.
Figure 7:
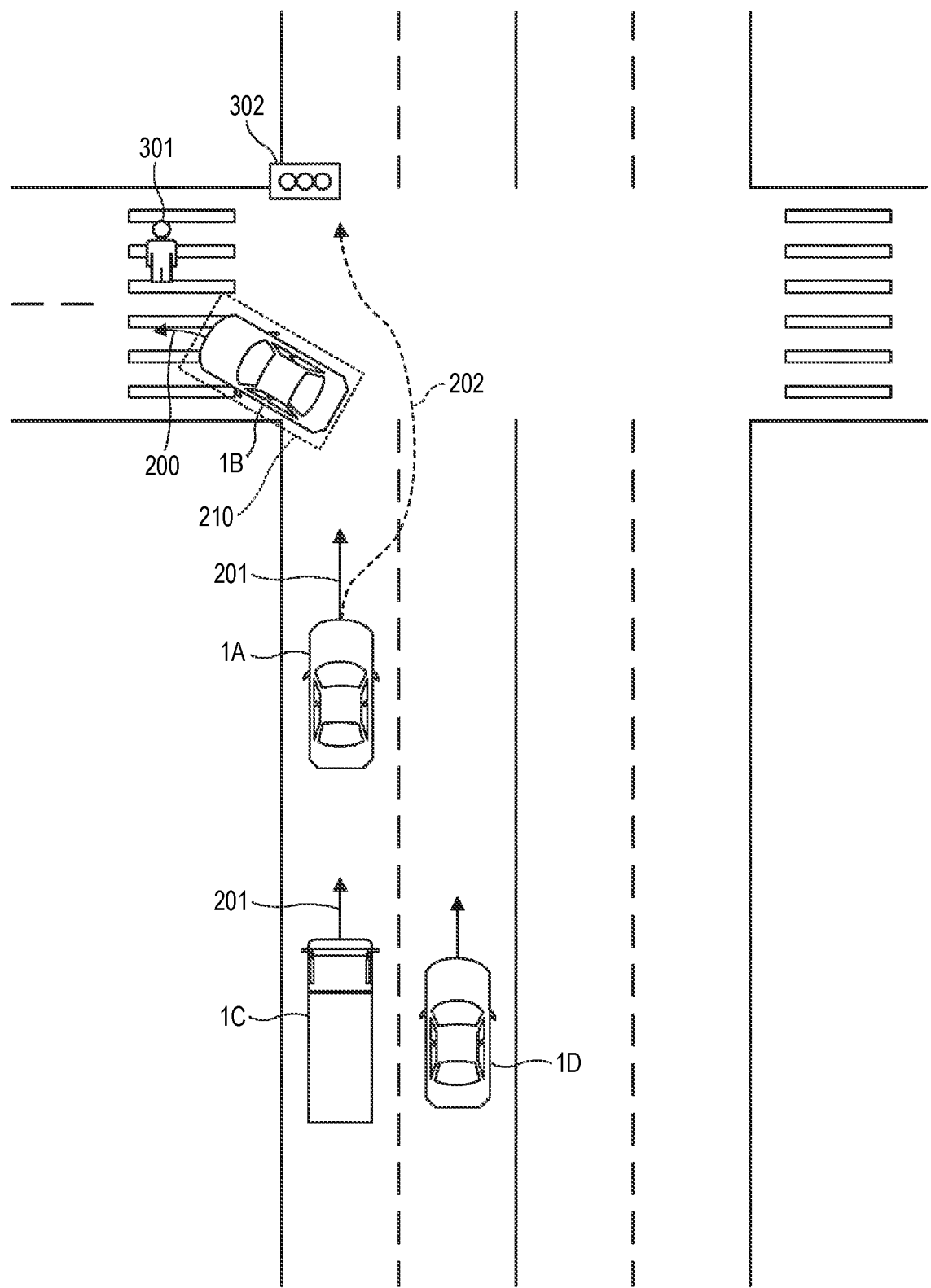
FIG. 7 is a diagram illustrating an example in which the vehicle 1A avoids the vehicle 1B that temporarily stops during a left turn.
Figure 9:
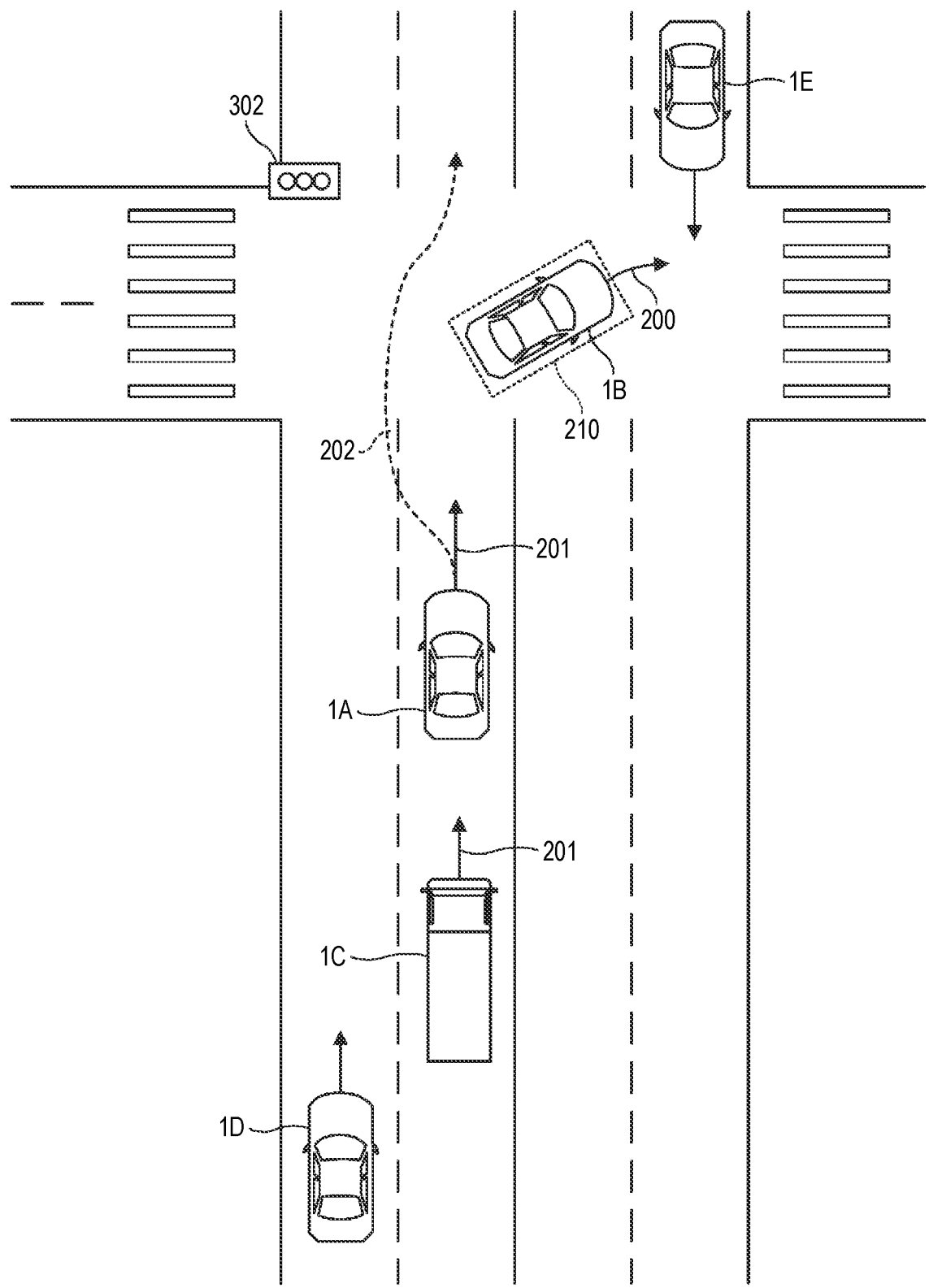
FIG. 9 is a diagram illustrating an example in which the vehicle 1A avoids the vehicle 1B that temporarily stops during a right turn.

The vehicle 1A, the vehicle 1B, and the vehicle 1C may have, for example, a positional relationship as illustrated in FIG. 5, FIG. 7, or FIG. 9, which will be described later. That is, the vehicle 1B may be located ahead of the vehicle 1A in a traveling direction, and the vehicle 1C may be located behind the vehicle 1A.

<<Process of Vehicle 1B>>

First, a process executed by the vehicle 1B will be described.

The vehicle 1B, while traveling on the scheduled route 200 (S101), determines immediately (or within a predetermined time from now) whether the vehicle 1B behaves in a way as to become an obstacle to the other vehicles 1A and 1C (S102). When the vehicle 1B does not immediately (or within the predetermined time from now) behave in a way as to become the obstacle to the other vehicles 1A and 1C (S102: NO), the vehicle 1B ends the present process. When the vehicle 1B immediately (or within the predetermined time from now) behaves in a way as to become the obstacle to the other vehicles 1A and 1C (S102: YES), the vehicle 1B performs a process of S103.

For example, when the vehicle 1B advances from a side road to an arterial road, the vehicle 1B may become the obstacle to the other vehicles 1A and 1C which are traveling on the arterial road, the determination in S102 is YES. A specific example of behaviors of the vehicles 1A, 1B, and 1C in this case will be described later in detail with reference to FIG. 5.

For example, when the vehicle 1B temporarily stops while turning left at an intersection, the vehicle 1B may become the obstacle to the other vehicles 1A and 1C which are traveling and following the vehicle 1B, and thus the determination in S102 is YES. A specific example of the behaviors of the vehicles 1A, 1B, and 1C in this case will be described later in detail with reference to FIG. 7.

For example, when the vehicle 1B temporarily stops while turning right at the intersection, the vehicle 1B may become the obstacle to the other vehicles 1A and 1C which are traveling and following the vehicle 1B, and thus the determination in S102 is YES. A specific example of the behaviors of the vehicles 1A, 1B, and 1C in this case will be described later in detail with reference to FIG. 9.

In S103, the vehicle 1B transmits the V2X information including the avoidance schedule flag "0", the scheduled route 200 of the vehicle 1B, the precise position (vehicle contour information) of the vehicle 1B, and the vehicle type and size of the vehicle 1B through the V2X communication (S103).

<<Process of Vehicle 1A>>

Next, a process executed by the vehicle 1A will be described.

For example, the vehicle 1A is traveling on the first scheduled route 201 (S201), and receives, through the V2X communication, the V2X information transmitted by the vehicle 1B in S103 (S202).

In this case, the vehicle 1A analyzes the first scheduled route 201 of the vehicle 1A and the scheduled route 200 of the vehicle 1B included in the V2X information, and when the vehicle 1A continues traveling along the first scheduled route 201, the vehicle 1A determines whether the possibility (probability) of the collision with the vehicle 1B is equal to or greater than the certain value (for example, equal to or greater than a predetermined threshold value) (S203).

When the vehicle 1A determines that the possibility of the collision with the vehicle 1B is less than a certain value (S203: NO), the vehicle 1A ends the present process. That is, the vehicle 1A continues traveling along the first scheduled route 201.

When the vehicle 1A determines that the possibility of the collision with the vehicle 1B is equal to or greater than the certain value (S203: YES), the vehicle 1A determines whether the second scheduled route 202 on which the vehicle 1B can be avoided can be generated (S204). For example, the vehicle 1A determines whether the second scheduled route 202 on which the vehicle 1B can be avoided can be generated based on the scheduled route 200 of the vehicle 1B, a situation around the vehicle 1A, and the like. A specific example of a determination method will be described later in detail with reference to FIGS. 5, 7, and 9.

When the vehicle 1A determines that the second scheduled route 202 on which the vehicle 1B can be avoided cannot be generated (S204: NO), the vehicle 1A temporarily stops behind the vehicle 1B (S205). Further, after the obstacle which is the vehicle 1B is eliminated, the vehicle 1A continues traveling on the first scheduled route 201.

When the vehicle 1A determines that the second scheduled route 202 on which the vehicle 1B can be avoided can be generated (S204: YES), the vehicle 1A generates the second scheduled route 202 on which the vehicle 1B can be avoided, and displays on the HMI device that the driving assistance or the autonomous driving is performed on the second scheduled route 202 (S206).

The vehicle 1A transmits the V2X information of the vehicle 1B and the V2X information including the avoidance schedule flag of "1" and the second scheduled route 202 of the vehicle 1A through the V2X communication (S207). Accordingly, the scheduled route 200 of the vehicle 1B and the second scheduled route 202 of the vehicle 1A can be transmitted to the other vehicle 1C following the vehicle 1A.

The vehicle 1A travels along the second scheduled route 202 to avoid the vehicle 1B (S208). After the vehicle 1A avoids and overtakes the vehicle 1B, the vehicle 1A displays on the HMI device 20 that avoidance of the vehicle 1B is completed (S209). Further, the vehicle 1A continues traveling on the first scheduled route 201.

According to the above-described process, since the vehicle 1A can receive the V2X information including the scheduled route 200, the precise position (vehicle contour information), and the vehicle type and size in advance from the vehicle 1B that may become the obstacle to the vehicle 1A, the vehicle 1A can generate the second scheduled route 202 on which the vehicle 1B can be avoided with a margin. That is, the vehicle 1A can smoothly avoid the collision with the vehicle 1B, which is an example of an obstacle present ahead, by traveling along the second scheduled route 202.

<<Process of Vehicle 1C>>

Next, a process executed by the vehicle 1C will be described.

For example, the vehicle 1C is traveling on a first scheduled route 201 (S301), and transmits, through the V2X communication, the V2X information of the vehicle 1B and the V2X information including the second scheduled route 202 of the vehicle 1A which are transmitted by the vehicle 1A in S207 (S302). The first scheduled route 201 of the vehicle 1C may be the same as or different from the first scheduled route 201 of the vehicle 1A.

In this case, the vehicle 1C displays on the HMI device 20 that the autonomous driving is performed with reference to the second scheduled route 202 of the vehicle 1A (S303).

The vehicle 1C transmits, through the V2X communication, the V2X information of the vehicle 1B and the V2X information including the second scheduled route 202 of the vehicle 1A (S304). Accordingly, the scheduled route 200 of the vehicle 1B and the second scheduled route 202 of the vehicle 1A can be transmitted to another vehicle 1D following the vehicle 1C.

The vehicle 1C travels along the second scheduled route 202 to avoid the vehicle 1B (S305). After the vehicle 1C avoids and overtakes the vehicle 1B, the vehicle 1C displays on the HMI device 20 that avoidance of the vehicle 1B is completed (S306). Further, the vehicle 1C continues traveling on the first scheduled route 201.

As described above, the other vehicle 1C or the like following the vehicle 1A can smoothly avoid the collision with the vehicle 1B present ahead, similarly to the vehicle 1A, by using the scheduled route 200 of the vehicle 1B transferred from the vehicle 1A through the V2X communication and the second scheduled route 202 of the vehicle 1A.

<Specific Example of Avoiding Vehicle that is Obstacle>

FIG. 5 is a diagram illustrating an example in which the vehicle 1A avoids the vehicle 1B advancing from the side road to the arterial road.

In a case in which the vehicle 1B suddenly exits from the front side road to the arterial road and temporarily stops, the vehicle 1B becomes the obstacle in a route of the vehicle 1A, and there is a risk that the vehicle 1A and the vehicle 1B collide with each other. On the other hand, in a case in which the vehicle 1A simply outputs an alarm of the collision and suddenly stops, a possibility of the collision with the following vehicle 1C and a possibility of occurrence of congestion due to a stop of the following vehicle 1C occur due to sudden braking. Therefore, there is a scene in which it is preferable for the vehicle 1A to turn slightly to the right and overtake the vehicle 1B while avoiding the vehicle 1B. Further, there is a scene in which it is preferable for the following vehicle 1C to turn to the right to avoid the vehicle 1B, like the vehicle 1A. Accordingly, both collision prevention and congestion prevention can be achieved.

In the first embodiment, the vehicle 1B that is the obstacle broadcasts the V2X information including the scheduled route on which the vehicle 1B will travel in the future, the precise position (vehicle contour information), and the vehicle type and size, to the surrounding vehicles 1A and 1C. For example, the vehicle 1B transmits the V2X information at a timing at which a head thereof is put out from the side road to the arterial road. The vehicle 1A present in the vicinity of the vehicle 1B receives the scheduled route and the precise position of the vehicle 1B that is the obstacle, determines a degree of risk of a collision with a straight traveling route of the vehicle 1A, determines the presence or absence of the following vehicle of an own vehicle lane and an adjacent lane, and an inter-vehicle space, and determines whether to turn to avoid the vehicle 1B. When it is determined that the vehicle 1A turns to avoid the vehicle 1B, the vehicle 1A turns to avoid the vehicle 1B based on the determination. When the vehicle 1A turns to avoid the vehicle 1B, the vehicle 1A automatically blinks a turn signal, and displays, on the display of the HMI device 20, a future travel trajectory (second scheduled route) indicating that the vehicle 1A turns to avoid the obstacle. The vehicle 1A may transmit, to the following vehicle 1C, the V2X information including the scheduled route (second scheduled route) along which the vehicle 1A turns to avoid the obstacle. The following vehicle 1C turns in the same manner as the second scheduled route included in the received V2X information to avoid the vehicle 1B that is the obstacle. Sharing of a travel route and the steering and avoidance operation that avoid the obstacle described above may be continuously performed until all the subsequent vehicles 1C and the like overtake the obstacle or until a position of the vehicle 1B which is the obstacle changes.

For example, the vehicle 1B transmits the V2X information through the V2X communication at the timing at which the head of the vehicle 1B is put out from the side road to the arterial road (S103).

The vehicle 1A traveling on the arterial road receives the V2X information from the vehicle 1B through the V2X communication (S202), and when there is the possibility of the collision with the vehicle 1B on the first scheduled route 201 (S203: YES), the vehicle 1A performs the following processes. That is, the vehicle 1A determines whether the second scheduled route 202 on which the vehicle 1B can be avoided can be generated based on the scheduled route 200 of the vehicle 1B, the vehicle contour information, and the vehicle type and size, and the surrounding situation (S204).

For example, in the case of the situation illustrated in FIG. 5, the second scheduled route 202 may be a route on which the vehicle 1A turns to a right front side so as to avoid a vehicle contour (rectangle 210) of the vehicle 1B protruding to the arterial road, turns to a left front side after passing through a right side of the vehicle 1B, and returns to an original lane. The second scheduled route 202 may be a route on which the vehicle 1A turns (steers) a steering wheel so as to avoid the vehicle contour (rectangle 210) of the vehicle 1B protruding to the arterial road, turns to the right front side, turns back to the left front side after passing through the right side of the vehicle 1B, travels along a curve of an avoidance route, and returns to the original lane.

For example, when the vehicle 1A does not collide with the other vehicle 1D different from the vehicle 1B even if the vehicle 1A travels along the second scheduled route 202 and does not interfere with the progress of the other vehicle 1D, the vehicle 1A may determine that the second scheduled route 202 can be generated. For example, in the case of the situation illustrated in FIG. 5, when the other vehicle 1D is not present on a right side of the vehicle 1A and a distance between the vehicle 1A and the other vehicle 1D present behind the vehicle 1A in the adjacent lane on the right side thereof is sufficient (for example, equal to or greater than a predetermined threshold value), the vehicle 1A may determine that the second scheduled route 202 can be generated.

On the other hand, when the other vehicle 1D is present on the right side of the vehicle 1A and the distance between the vehicle 1A and the other vehicle 1D present behind the vehicle 1A in the adjacent lane on the right side thereof is not sufficient (for example, less than the predetermined threshold value), the vehicle 1A may determine that the second scheduled route 202 cannot be generated. In this case, the vehicle 1A may temporarily stop behind the vehicle 1B (S205). When the vehicle 1A temporarily stops in this manner, the vehicle 1A may transmit, to the vehicle 1B, information indicating that the vehicle 1A temporarily stops behind the vehicle 1B through the V2X communication. When the vehicle 1B receives, from the vehicle 1B, the information indicating that the vehicle 1A temporarily stops in this manner through the V2X communication, the vehicle 1B may start traveling in accordance with the scheduled route 200.

The vehicle 1A traveling along the second scheduled route 202 may automatically blink a right turn signal when the vehicle 1A turns to the right front side, and may automatically blink a left turn signal when the vehicle 1A turns to the left front side after the vehicle 1A overtakes the vehicle 1B.

Figure 6:
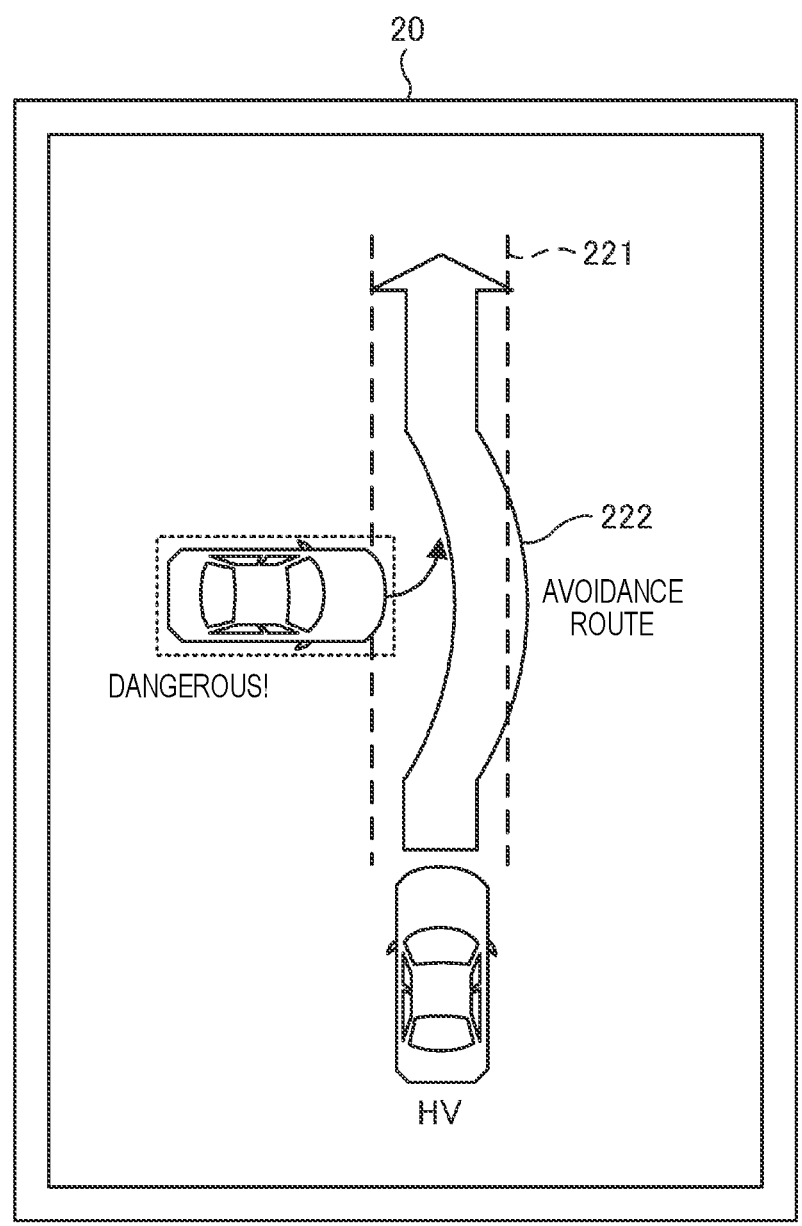
FIG. 6 is a diagram showing an example of a UI image displayed on an HMI device of the vehicle 1A in the case of FIG. 5.

As illustrated in FIG. 6, the vehicle 1A traveling on the second scheduled route 202 may display the trajectory of the second scheduled route 202 on the display device of the HMI device 20 (S206). FIG. 6 is a diagram showing an example of a UI image displayed on the HMI device 20 of the vehicle 1A in the case of FIG. 5. In FIG. 6, dotted lines 221 indicate the trajectory of the first scheduled route 201 of the vehicle 1A, and a thick arrow 222 of a solid line indicates the trajectory of the second scheduled route 202 (that is, the avoidance route) of the vehicle 1A.

When the vehicles 1A and 1C are compatible with the V2X communication and the ADAS but are not compatible with the autonomous driving, the vehicles 1A and 1C may perform the driving assistance along the second scheduled route 202. For example, the vehicles 1A and 1C may display the second scheduled route 202 on the HMI device 20 and assist a steering operation of the driver so that the vehicles 1A and 1C can easily travel along the second scheduled route 202.

When the vehicles 1A and 1C are not compatible with the V2X communication, the driver may manually operate the steering wheel to avoid the vehicle 1B. In this case, the vehicles 1A and 1C may display the second scheduled route 202 on the HMI device 20.

FIG. 7 is a diagram illustrating an example in which the vehicle 1A avoids the vehicle 1B that temporarily stops during a left turn.

For example, as illustrated in FIG. 7, in a case in which a pedestrian 301 crossing the crosswalk to which the vehicle 1B is making a left turn is present, the vehicle 1B temporarily stops the progress of the left turn. In this case, the vehicle 1B may transmit the V2X information through the V2X communication at a timing when the progress of the left turn is temporarily stopped (S103).

The vehicle 1A traveling behind the vehicle 1B receives the V2X information from the vehicle 1B through the V2X communication (S202), and when there is the possibility of the collision with the vehicle 1B on the first scheduled route 201 (S203: YES), the vehicle 1A performs the following processes. That is, the vehicle 1A determines whether the second scheduled route 202 on which the vehicle 1B can be avoided can be generated based on the scheduled route 200 of the vehicle 1B, the vehicle contour information, and the vehicle type and size, and the surrounding situation (S204). For example, in the case of the situation illustrated in FIG. 7, the second scheduled route 202 may be a route on which the vehicle 1A turns to the right front side so as to avoid the vehicle contour (rectangle 210) of the vehicle B temporarily stopping while turning left, turns to the left front side after passing through the right side of the vehicle 1B, and returns to the original lane. The second scheduled route 202 may be a route on which the vehicle 1A turns (steers) the steering wheel so as to avoid the vehicle contour (rectangle 210) of the vehicle 1B temporarily stopping while turning left, turns to the right front side, turns back to the left front side after passing through the right side of the vehicle 1B, travels along the curve of the avoidance route, and returns to the original lane.

For example, when the vehicle 1A does not collide with the other vehicle 1D different from the vehicle 1B even if the vehicle 1A travels along the second scheduled route 202 and does not interfere with the progress of the other vehicle 1D, the vehicle 1A may determine that the second scheduled route 202 can be generated. For example, in the case of the situation illustrated in FIG. 7, when a traffic light 302 in front is a traveling permission signal (for example, a blue signal), the other vehicle 1D is not present on the right side of the vehicle 1A, and the other vehicle 1D is not present within a predetermined distance behind the vehicle 1A in the adjacent lane on the right side thereof, the vehicle 1A may determine that the second scheduled route 202 can be generated.

On the other hand, when the traffic light 302 in front is a traveling prohibition signal (for example, a red light), when the other vehicle 1D is present on the right side of the vehicle 1A, or when the other vehicle 1D is present within the predetermined distance behind the vehicle 1A in the adjacent lane on the right side thereof, the vehicle 1A may determine that the second scheduled route 202 cannot be generated. In this case, the vehicle 1A may temporarily stop behind the vehicle 1B (S205).

The vehicle 1A traveling along the second scheduled route 202 may automatically blink a right turn signal when the vehicle 1A turns to the right front side, and may automatically blink a left turn signal when the vehicle 1A turns to the left front side after the vehicle 1A overtakes the vehicle 1B.

Figure 8:
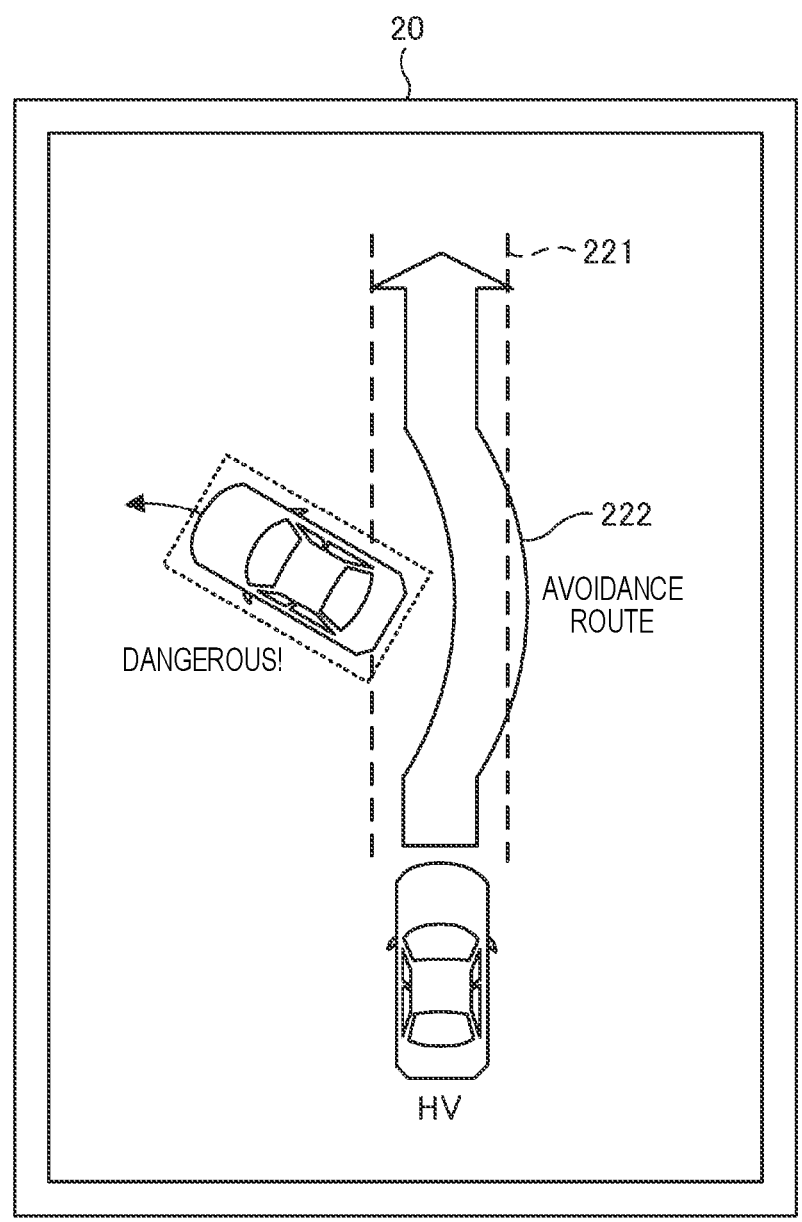
FIG. 8 is a diagram showing an example of the UI image displayed on the HMI device of the vehicle 1A in the case of FIG. 7.

As illustrated in FIG. 8, the vehicle 1A traveling on the second scheduled route 202 may display the trajectory of the second scheduled route 202 on the display device of the HMI device 20 (S206). FIG. 8 is a diagram showing an example of the UI image displayed on the HMI device 20 of the vehicle 1A in the case of FIG. 7. In FIG. 8, the dotted lines 221 indicate the trajectory of the first scheduled route 201 of the vehicle 1A, and the thick arrow 222 of the solid line indicates the trajectory of the second scheduled route 202 (that is, the avoidance route) of the vehicle 1A.

FIG. 9 is a diagram illustrating an example in which the vehicle 1A avoids the vehicle 1B that temporarily stops during a right turn.

For example, as illustrated in FIG. 9, when there is a vehicle 1E proceeding straight through an intersection from an oncoming lane, the vehicle 1B temporarily stops a progress of a right turn. In this case, the vehicle 1B may transmit the V2X information through the V2X communication at a timing when the progress of the right turn is temporarily stopped (S103).

The vehicle 1A traveling behind the vehicle 1B receives the V2X information from the vehicle 1B through the V2X communication (S202), and when there is the possibility of the collision with the vehicle 1B on the first scheduled route 201 (S203: YES), the vehicle 1A performs the following processes. That is, the vehicle 1A determines whether the second scheduled route 202 on which the vehicle 1B can be avoided can be generated based on the scheduled route 200 of the vehicle 1B, the vehicle contour information, and the vehicle type and size, and the surrounding situation (S204). For example, in the case of the situation illustrated in FIG. 9, the second scheduled route 202 may be a route on which the vehicle 1A turns to a left front side so as to avoid the vehicle contour (rectangle 210) of the vehicle 1B temporarily stopping while turning right, turns to a right front side after passing through a left side of the vehicle 1B, and returns to the original lane. The second scheduled route 202 may be a route on which the vehicle 1A turns (steers) the steering wheel so as to avoid the vehicle contour (rectangle 210) of the vehicle 1B temporarily stopping while turning right, turns to the left front side, turns back to the right front side after passing through the left side of the vehicle 1B, travels along the curve of the avoidance route, and returns to the original lane.

For example, when the vehicle 1A does not collide with the other vehicle 1D different from the vehicle 1B even if the vehicle 1A travels along the second scheduled route 202 and does not interfere with the progress of the other vehicle 1D, the vehicle 1A may determine that the second scheduled route 202 can be generated. For example, in the case of the situation illustrated in FIG. 9, when the traffic light 302 in front is the traveling permission signal (for example, a blue signal), the other vehicle 1D is not present on a left side of the vehicle 1A and a distance between the vehicle 1A and the other vehicle 1D present behind the vehicle 1A in an adjacent lane on the left side thereof is sufficient (for example, equal to or greater than the predetermined threshold value), the vehicle 1A may determine that the second scheduled route 202 can be generated.

On the other hand, when the traffic light 302 in front is the traveling prohibition signal (for example, a red light), the other vehicle 1D is present on the left side of the vehicle 1A and the distance between the vehicle 1A and the other vehicle 1D present behind the vehicle 1A in the adjacent lane on the left side thereof is not sufficient (for example, less than the predetermined threshold value), the vehicle 1A may determine that the second scheduled route 202 cannot be generated. In this case, the vehicle 1A may temporarily stop behind the vehicle B (S205).

The vehicle 1A traveling along the second scheduled route 202 may automatically blink the left turn signal when the vehicle 1A turns to the left front side, and may automatically blink the right turn signal when the vehicle 1A turns to the right front side after the vehicle 1A overtakes the vehicle 1B.

Figure 10:
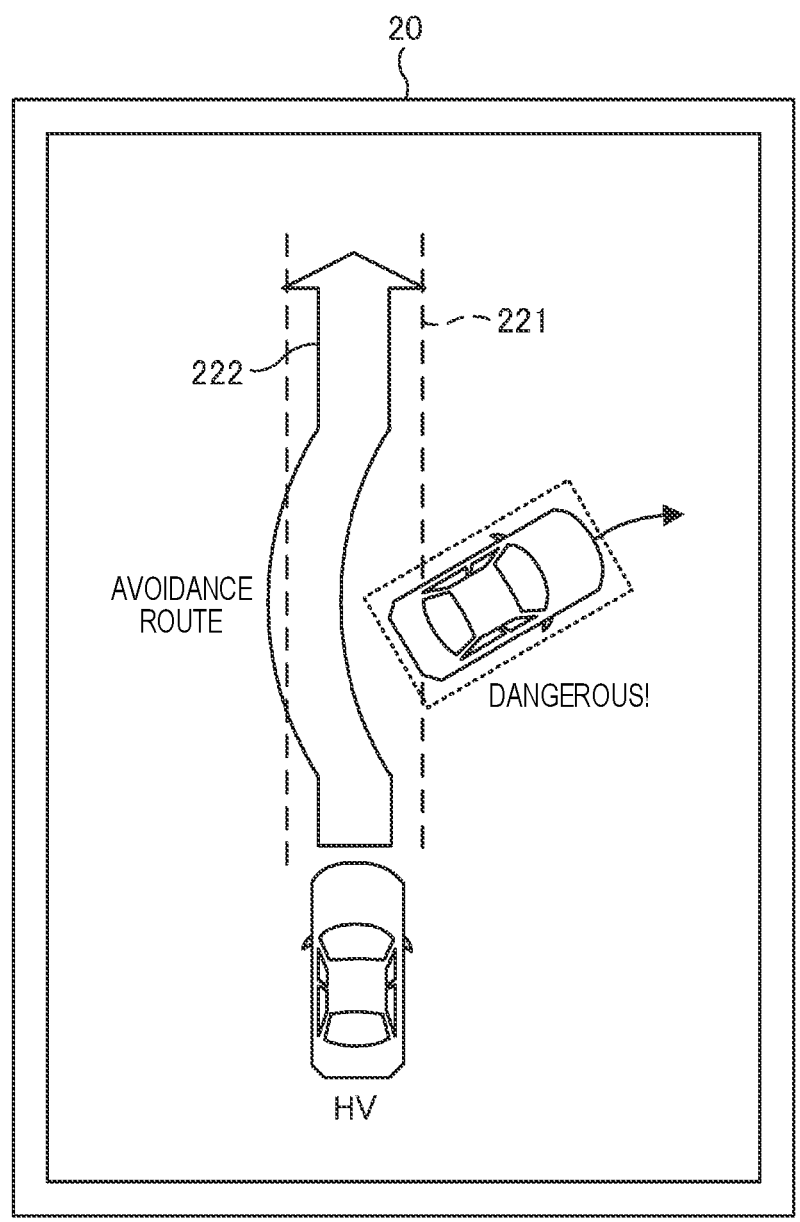
FIG. 10 is a diagram showing an example of the UI image displayed on the HMI device of the vehicle 1A in the case of FIG. 9.

As illustrated in FIG. 10, the vehicle 1A traveling on the second scheduled route 202 may display the trajectory of the second scheduled route 202 on the display device of the HMI device 20 (S206). FIG. 10 is a diagram showing an example of the UI image displayed on the HMI device 20 of the vehicle 1A in the case of FIG. 9. In FIG. 10, the dotted lines 221 indicate the trajectory of the first scheduled route 201 of the vehicle 1A, and the thick arrow 222 of the solid line indicates the trajectory of the second scheduled route 202 (that is, the avoidance route) of the vehicle 1A.

Second Embodiment

A vehicle and a control device according to a second embodiment will be described. In the second embodiment, the same components as those of the first embodiment may be denoted by the same reference numerals, and a description thereof may be omitted. Further, a content described in the second embodiment may be implemented together with the content described in the first embodiment.

<Configuration of Device>

Figure 11:
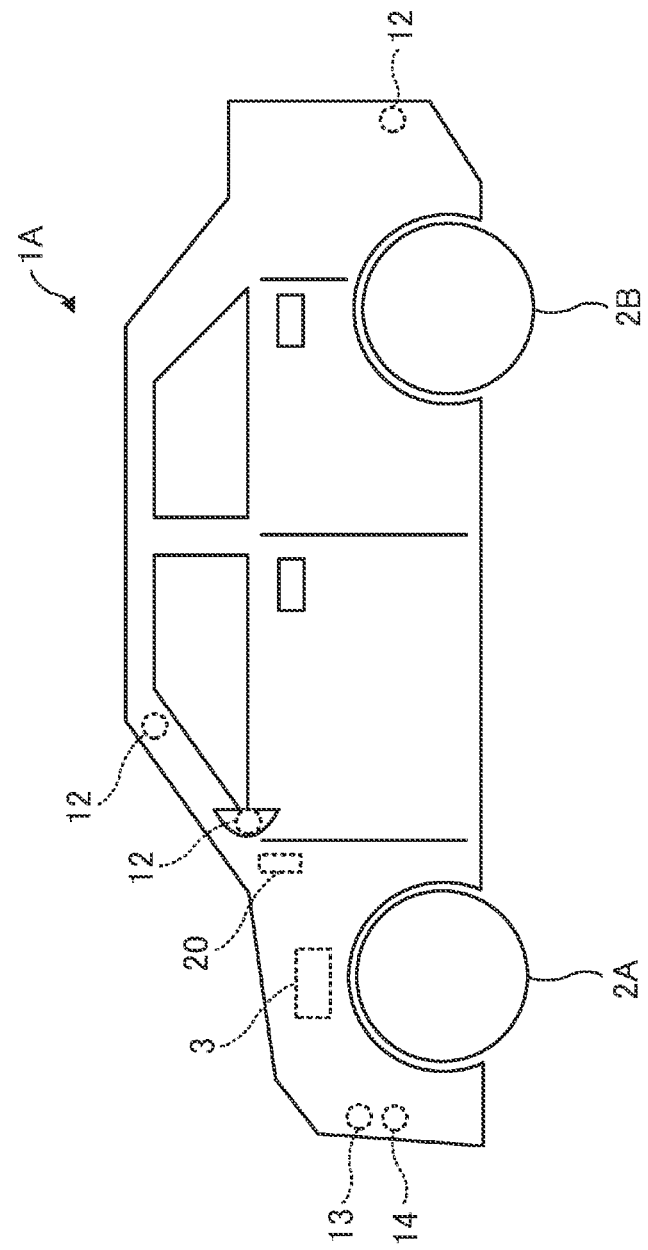
FIG. 11 is a side view showing an example of a configuration of the vehicle 1A according to a second embodiment.
Figure 12:
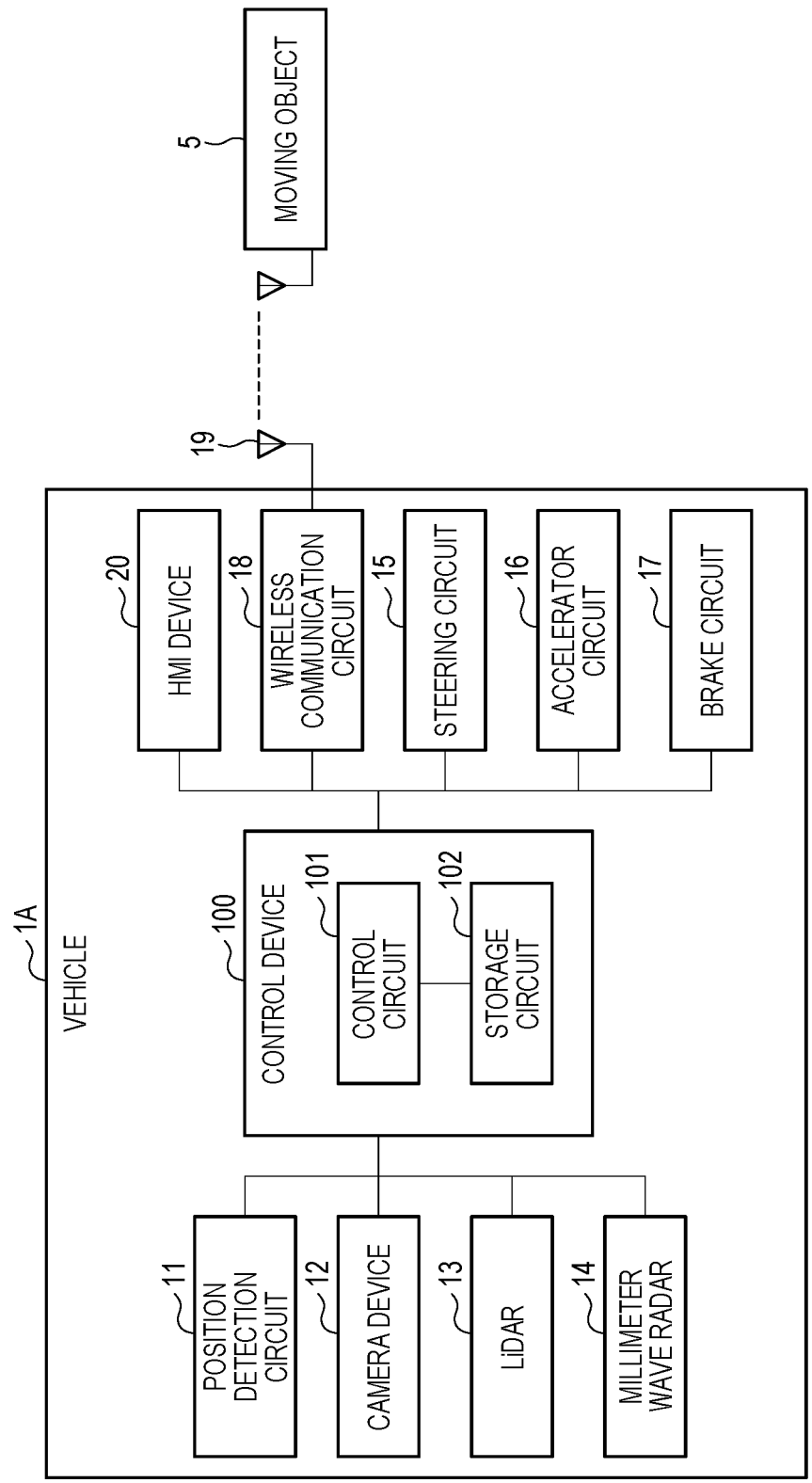
FIG. 12 is a block diagram showing an example of a configuration of devices provided in the vehicle 1A according to the second embodiment.
Figure 13:
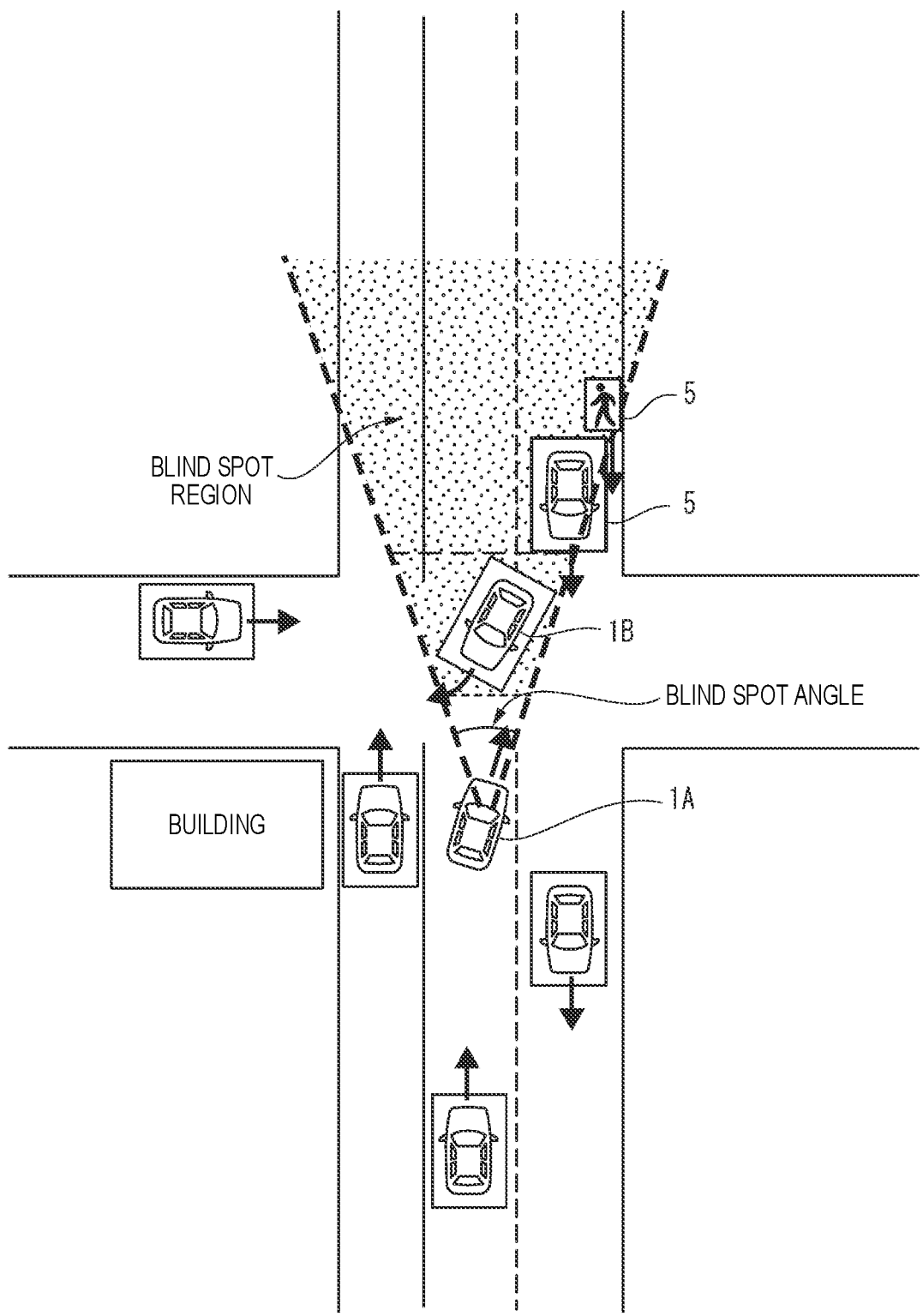
FIG. 13 is a schematic diagram illustrating a blind spot region of the vehicle 1A according to the second embodiment.
Figure 14A:
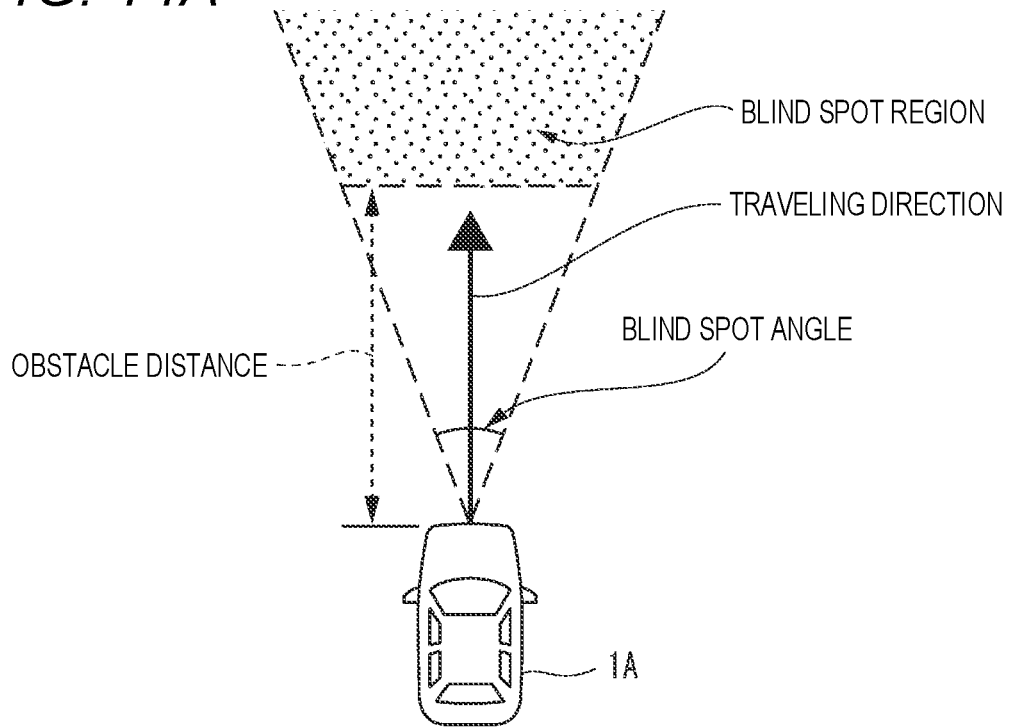
FIG. 14A is an image diagram illustrating blind spot region information according to the second embodiment.
Figure 14B:
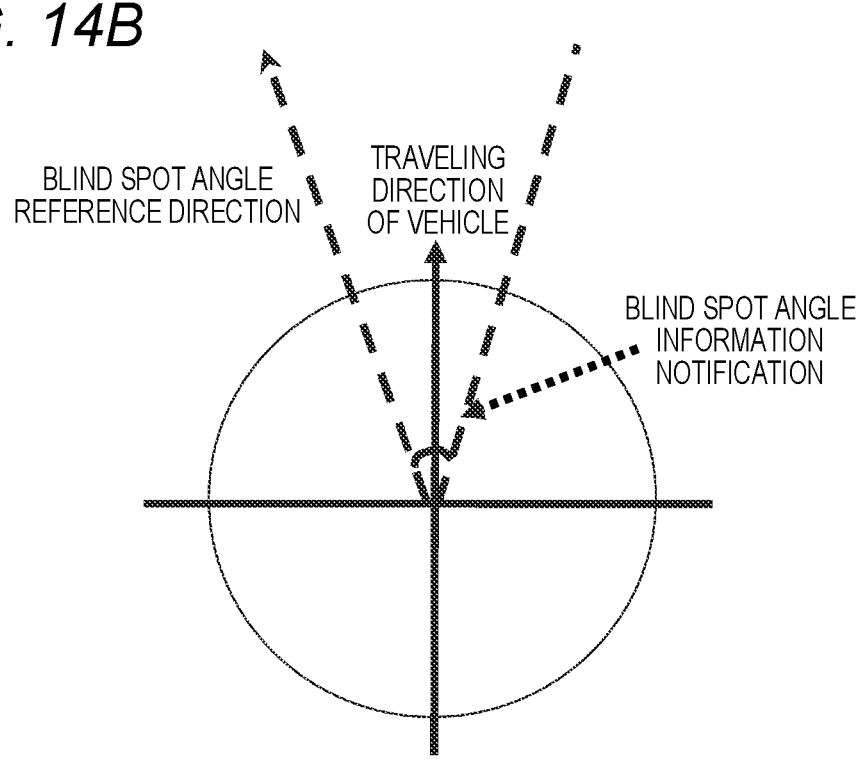
FIG. 14B is a detailed diagram illustrating the blind spot region information according to the second embodiment.

FIG. 11 is a side view illustrating an example of a configuration of the vehicle 1A according to a second embodiment. FIG. 12 is a block diagram showing an example of a configuration of devices provided in the vehicle 1A according to the second embodiment. FIG. 13 is a schematic diagram illustrating a blind spot region of the vehicle 1A according to the second embodiment. FIG. 14A is an image diagram illustrating blind spot region information according to the second embodiment. FIG. 14B is a detailed diagram illustrating the blind spot region information according to the second embodiment. Specifically, FIG. 14B is a detailed diagram of blind spot angle information indicating the blind spot region hidden by an obstacle which is a shield as viewed from the viewpoint of an in-vehicle ADAS front camera. Here, all 360 degrees of front, rear, left, and right directions of the vehicle form a direction system of a round circular compass, and are represented by a coordinate system showing two-dimensional directions of an X-axis and a Y-axis. A vertical axis, that is, Y axis indicates an angle in a traveling direction of the vehicle. A blind spot angle reference direction is a direction indicated by a left side line of a blind spot angle line, and a blind spot angle is an angle of the blind spot region hidden from the ADAS front camera viewpoint, hidden by the vehicle which is the obstacle. A depth distance range of the blind spot is a depth distance range of the blind spot region that is hidden behind the vehicle which is the obstacle and cannot be seen. By using the blind spot angle information of FIG. 14B and a GPS position of the vehicle, it is possible to accurately express and specify where the blind spot region for the vehicle 1A is.

As illustrated in FIG. 11, the vehicle 1A includes the first wheels 2A and the second wheels 2B, and is movable in a predetermined direction using the first wheels 2A and the second wheels 2B. The predetermined direction may be read as a traveling direction of the vehicle 1A. The traveling direction is not limited to a direction of the straight traveling, and may include a direction of right turning and a direction of left turning.

As illustrated in FIG. 12, the vehicle 1A includes the position detection circuit 11, the camera device 12, the LiDAR 13, the millimeter wave radar 14, the steering circuit 15, the accelerator circuit 16, the brake circuit 17, the wireless communication circuit 18, the control device 100, and the HMI device 20.

The position detection circuit 11 detects a position of the vehicle 1A. The position of the vehicle 1A may be read as a first position.

The wireless communication circuit 18 receives a position of another vehicle, a pedestrian, or the like through V2X communication. Hereinafter, the other vehicle, the pedestrian, or the like may be referred to as a moving object 5 in some cases. A position of the moving object 5 may be read as a second position.

An imaging circuit constituting the camera device 12 captures an image of an outside of the vehicle 1A and acquires the captured image.

With respect to the first position, the control circuit 101 sets, as the blind spot region, a region that becomes a blind spot due to the obstacle from a size of the obstacle detected from the captured image and a relative position between the obstacle and the vehicle 1A. The obstacle is, for example, the other vehicle 1B present in the traveling direction of the vehicle 1A.

When the second position enters the blind spot region, an output circuit may output information calling first attention. In a case in which the second position does not enter the blind spot region, the output circuit may output information calling second attention. The output circuit may be an interface that outputs information to a display circuit or another device (for example, an electronic control unit (ECU)). The display circuit may be configured as the HMI device 20.

Intensity (hereinafter, referred to as first intensity) for calling the attention to the information calling the first attention may be stronger than intensity (hereinafter, referred to as second intensity) for calling the attention to the information calling the second attention. In other words, the second intensity may be lower than the first intensity. Output of the information calling the second attention may mean that no information is output, or may mean that very little information is output.

In a case in which the second position is a position corresponding to a predetermined direction of the vehicle 1A and the second position enters the blind spot region, the output circuit may output the information calling the first attention. In a case in which the second position is the position corresponding to the predetermined direction of the vehicle 1A and the second position is not in the blind spot region, the output circuit may output the information calling the second attention. Here, the predetermined direction may be the traveling direction of the vehicle 1A. Accordingly, in a case in which the second position is a position (for example, just beside the vehicle 1A) different from the traveling direction of the vehicle 1A, the output circuit may not output information calling the attention.

The imaging circuit may acquire the captured image such that at least a part of the captured image includes a predetermined direction (for example, a traveling direction) outside the vehicle 1A.

The wireless communication circuit 18 may transmit the blind spot region through the V2X communication. The moving object 5 that has received the blind spot region through the V2X communication may transmit the second position through the V2X communication when the moving object 5 is in the blind spot region. When the second position enters the blind spot region, the output circuit may output the information calling the first attention. When the second position does not enter the blind spot region, the output circuit may output the information calling the second attention.

When the control circuit 101 detects the obstacle from the captured image, the wireless communication circuit 18 may transmit the blind spot region through the V2X communication.

The output circuit may be the display circuit. At least the information calling the first attention output from the display circuit may include a predetermined image at a position corresponding to the second position in a display region of the display circuit.

The moving object 5 may include at least a first communication device that can be carried by the pedestrian and a second communication device that can be installed in the vehicle. The wireless communication circuit 18 may be further configured such that the moving object 5 receives a first communication device type corresponding to the first communication device and a second communication device type corresponding to the second communication device. When the wireless communication circuit 18 receives the first communication device type, the information calling the first attention output by the display circuit may include a first image corresponding to the first communication device in the display region of the display circuit. When the wireless communication circuit 18 receives the second communication device type, the information calling the first attention output by the display circuit may include a second image corresponding to the second communication device in the display region of the display circuit. Here, the first image and the second image may be different images.

When the second position enters the blind spot region, the output circuit may output the information calling the first attention. Thereafter, when the second position does not enter the blind spot region, the output circuit may output information calling third attention. Here, the first intensity for calling the attention to the information calling the first attention may be stronger than intensity (hereinafter, referred to as third intensity) for calling the attention to the information calling the third attention. In other words, the third intensity may be weaker than the first intensity. Output of the information calling the third attention may mean that no information is output, or may mean that very little information is output.

For example, in FIG. 13, since the vehicle 1B is present in the traveling direction of the vehicle 1A, the other side of the vehicle 1B is the blind spot region as viewed from the driver of the vehicle 1A.

The control circuit 101 of the vehicle 1A may detect the blind spot region by the following (A1) to (A3).

(A1) The control circuit 101 analyzes a captured image obtained by capturing the image of the traveling direction of the vehicle 1A by the camera device 12, and detects a contour of the obstacle and a relative distance from the vehicle 1A to the obstacle (hereinafter, referred to as an obstacle distance). In the case of FIG. 13, the control circuit 101 detects a contour of the vehicle 1B as a contour of the obstacle. The obstacle distance may be detected using a parallax of two captured images, or may be detected using the LiDAR 13 or the millimeter wave radar 14.

(A2) The control circuit 101 calculates the blind spot angle based on a size of the contour of the obstacle detected in (A1) and the obstacle distance.

(A3) The control circuit 101 detects the blind spot region based on the blind spot angle and the obstacle distance. For example, as illustrated in FIG. 14A, the control circuit 101 may detect, as the blind spot region, a region that is beyond the obstacle distance in a sectorial region that expands at the blind spot angle in the traveling direction of the vehicle 1A.

Information indicating the blind spot region (hereinafter, referred to as blind spot region information) may include the position (first position) of the vehicle 1A, the traveling direction of the vehicle 1A, the blind spot angle, the blind spot angle reference direction, a depth distance range of the blind spot, and the obstacle distance (see FIG. 16). Accordingly, as illustrated in FIGS. 13, 14A, and 14B, the blind spot region of the vehicle 1A can be identified.

The vehicle 1A may detect the moving object 5 in the blind spot region by at least one of the following methods (B1) and (B2).

(B1) A device (first communication device or second communication device) provided in the moving object 5 appropriately transmits (for example, broadcasts) the position (second position) of the moving object 5 through the V2X communication. The control circuit 101 of the vehicle 1A receives the position (second position) of the moving object 5 described above through the V2X communication through the wireless communication circuit 18. The control circuit 101 of the vehicle 1A detects the position of the moving object 5 in the blind spot region (that is, the moving object 5 in the blind spot region) among received positions of the moving object 5.

(B2) The vehicle 1A transmits (for example, broadcasts) the blind spot region information through the V2X communication through the wireless communication circuit 18. When the moving object 5 that has received the blind spot region information is in the blind spot region indicated by the blind spot region information, the moving object 5 returns (feeds back) the position (second position) of the moving object 5 to the vehicle 1A through the V2X communication. Accordingly, the vehicle 1A can detect the moving object 5 in the blind spot region.

In the above (B1) and (B2), the device provided in the moving object 5 may transmit information (hereinafter, referred to as moving object type information) indicating a type of the moving object 5 in combination. For example, when the moving object 5 is a vehicle, the second communication device installed in the vehicle transmits the moving object type information indicating the "vehicle". When the moving object 5 is a pedestrian, the first communication device carried by the pedestrian transmits the moving object type information indicating the "pedestrian".

<Display of Information Calling Attention>

Figure 15:
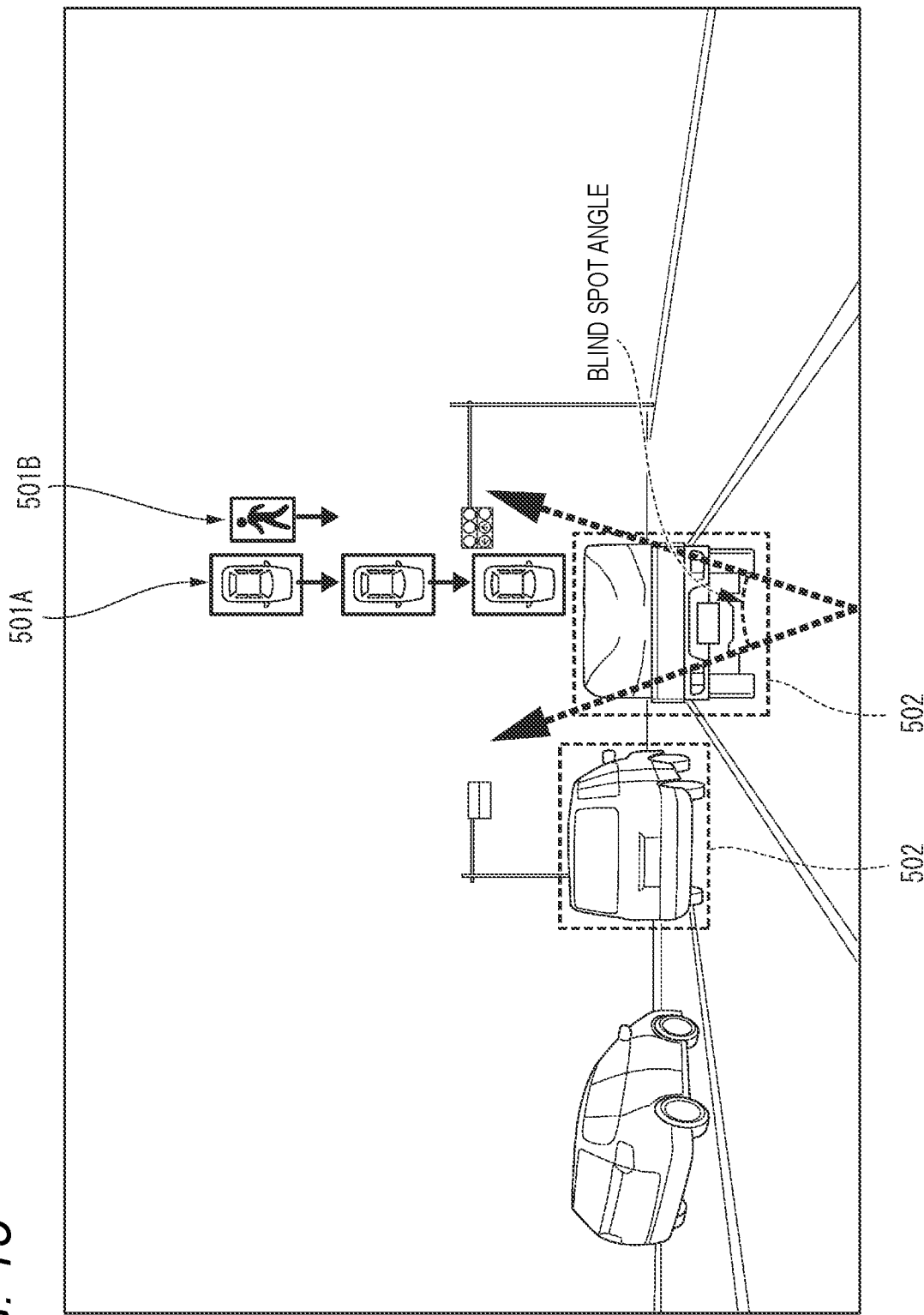
FIG. 15 is a diagram showing an example of a display of information calling attention according to the second embodiment.

FIG. 15 is a diagram illustrating an example of display of information calling attention according to the second embodiment.

When the position of the moving object 5 is in the blind spot region, the control circuit 101 may display the information calling the first attention on the HMI device 20 which is an example of the display circuit. For example, when the control circuit 101 detects that three other vehicles and one pedestrian are present in the blind spot region, as illustrated in FIG. 15, the control circuit 101 may display an image (vehicle icon 501A) indicating the three vehicles and an image (pedestrian icon 501B) indicating the one pedestrian on a contour 502 of the obstacle of the captured image displayed on the HMI device 20. The pedestrian icon 501B is an example of the first image, and the vehicle icon 501A is an example of the second image. The control circuit 101 may determine whether the moving object 5 in the blind spot region is the vehicle or the pedestrian based on the moving object type information described above. Accordingly, the driver of the vehicle 1A can recognize that the three vehicles and the one pedestrian are present in the blind spot region formed due to the obstacle (for example, another vehicle). Accordingly, the driver can more safely drive the vehicle 1A.

When the position of the moving object 5 does not enter the blind spot region, the control circuit 101 may display, on the HMI device 20 which is an example of the display circuit, the information calling the second attention, or may not be displayed on the HMI device 20. That is, the intensity (first intensity) of the attention to the information calling the first attention may be stronger than the intensity (second intensity) of the attention to the information calling the second attention.

As illustrated in FIG. 15, the control circuit 101 may display the contour 502 of the obstacle on the captured image displayed on the HMI device 20. In addition, the control circuit 101 may display, in the captured image, the blind spot angle formed by the contour 502 of the obstacle and a boundary line of the sectorial blind spot region formed by the blind spot angle.

In a case in which the display circuit is a head-up display (HUD), the control circuit 101 may display the contour 502 of the obstacle illustrated in FIG. 15, the blind spot angle, and the boundary line along with the obstacle seen through the HUD.

<V2X Communication Format>

FIG. 16 is a diagram showing an example of a V2X communication format of blind spot region information set according to the second embodiment.

The blind spot region information set is used when the information (blind spot region information) indicating the blind spot region of the vehicle 1A is transmitted to the moving object 5 through the V2X communication.

As illustrated in FIG. 16, the blind spot region information may include the blind spot angle of the vehicle 1A, the blind spot angle reference direction of the vehicle 1A, the depth distance range of the blind spot of the vehicle 1A, the traveling direction of the vehicle 1A, the position of the vehicle 1A, the obstacle distance from the vehicle 1A, and a speed of the vehicle 1A.

The blind spot angle of the vehicle 1A may be calculated as described above.

The traveling direction of the vehicle 1A may be calculated based on a steering angle of a steering wheel in the steering circuit 15. The traveling direction of the vehicle 1A may be represented by an azimuth, or may be expressed by 360-degree azimuth angles, in which the north is 0 degrees (or 360 degrees), the east is 90 degrees, the south is 180 degrees, and the west is 270 degrees.

The position of the vehicle 1A may be calculated by the position detection circuit 11. The position of the vehicle 1A may be represented by a set of longitude, latitude, and altitude.

The obstacle distance may be calculated as described above.

The speed of the vehicle 1A may be calculated by a predetermined speed measurement device (not illustrated) provided in the vehicle 1A.

The blind spot region information set may include a plurality of pieces of blind spot region information. In this case, in the blind spot region information set, the blind spot region information may be arranged in ascending order of the obstacle distance (that is, in order from the obstacle closest to the vehicle 1A). For example, when a first obstacle and a second obstacle are present in order of proximity to the vehicle 1A, a first blind spot region information indicating a blind spot region formed by the first obstacle and a second blind spot region information indicating a blind spot region formed by the second obstacle may be arranged in order in the blind spot region information set transmitted by the vehicle 1A.

The information indicating the blind spot region is not limited to the example described above. For example, the information indicating the blind spot region may be represented by a combination of a plurality of triangles. In this case, a position and a shape of the triangle may be represented as a set of longitude, latitude and altitude for each of three vertices. The blind spot region information set may include information indicating the position and the shape of each of the triangles forming the blind spot region.

FIG. 17 is a diagram illustrating an example of a V2X communication format of moving object position information according to the second embodiment.

The moving object position information is used when the moving object 5 that has received the blind spot region information transmits (that is, feeds back) information indicating the position and the like of the moving object 5 to the vehicle that is a transmission source of the blind spot region information.

As illustrated in FIG. 17, the moving object position information may include the position of the moving object 5, the traveling direction of the moving object 5, the speed of the moving object 5, and a V2X communication terminal ID of the vehicle as the transmission source of the blind spot region information.

The position, the traveling direction, and the speed of the moving object 5 may be calculated in the same manner as the position, the traveling direction, and the speed of the vehicle 1A described above. When the moving object 5 is a pedestrian, the traveling direction and the speed of the moving object 5 may be measured by a predetermined sensor (for example, an acceleration sensor, a gyro sensor, or a magnetic sensor) provided in a terminal of the moving object 5.

The V2X communication terminal ID of the vehicle that is the transmission source of the blind spot region information may be included in the blind spot region information set (see FIG. 16) transmitted by the vehicle through the V2X communication.

FIG. 18 is a diagram showing an example of a V2X communication format of broadcast position information according to the second embodiment.

The broadcast position information is used when the vehicle 1A or the moving object 5 broadcasts the information indicating the position and the like of the vehicle 1A or the moving object 5 to surroundings through the V2X communication.

As illustrated in FIG. 29, the broadcast position information may include the position of the vehicle 1A or the moving object 5, the traveling direction of the vehicle 1A or the moving object 5, and the speed of the vehicle 1A or the moving object 5.

<Flowchart>

Figure 19:
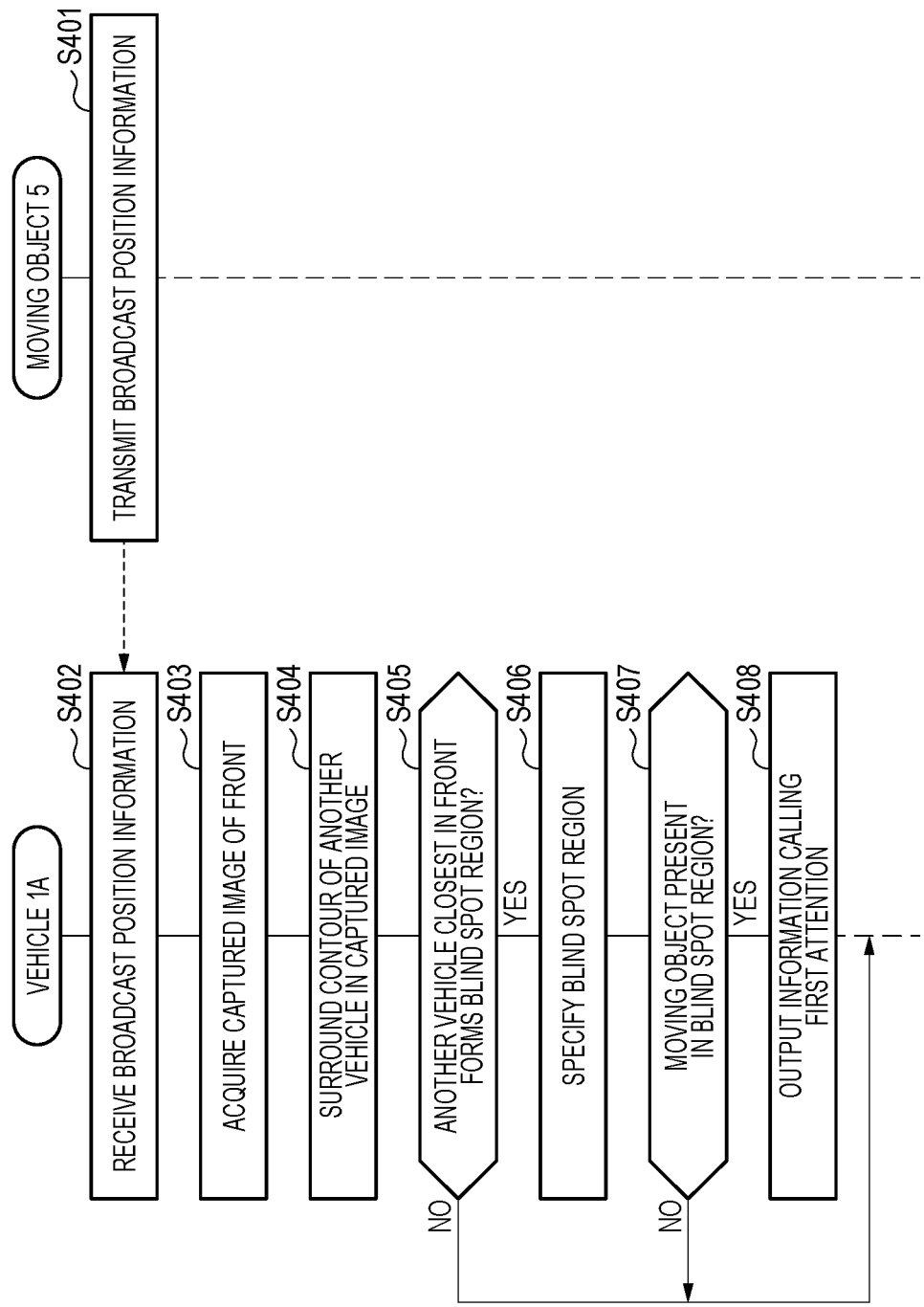
FIG. 19 is a flowchart showing an example of a process in a case in which the vehicle 1A determines whether a moving object according to the second embodiment is in the blind spot region of the vehicle 1A.

FIG. 19 is a flowchart showing an example of a process in a case in which the vehicle 1A determines whether the moving object 5 according to the second embodiment is in the blind spot region of the vehicle 1A.

In S401, the moving object 5 broadcasts the broadcast position information (see FIG. 18) through the V2X communication.

In S402, the vehicle 1A receives the broadcast position information in S401 from the moving object 5.

In S403, the vehicle 1A obtains a captured image of the front through the camera device 12.

In S404, the vehicle 1A detects another vehicle from the captured image in S403, and surrounds a contour of the vehicle with a rectangular frame.

In S405, the vehicle 1A determines whether another vehicle closest in the front (that is, an obstacle of an obstacle distance is shortest) forms the blind spot region. For example, when the traveling direction of the vehicle 1A is in a range of the blind spot angle, the vehicle 1A determines that the blind spot region is formed.

When the vehicle 1A determines that the other vehicle (that is, the obstacle) closest in the front does not form the blind spot region (S405: NO), the vehicle 1A ends the present process.

When the vehicle 1A determines that the other vehicle (that is, the obstacle) closest in the front forms the blind spot region (S405: YES), the vehicle 1A proceeds to a process of S406.

In S406, the vehicle 1A specifies the blind spot region formed by the obstacle.

In S407, the vehicle 1A determines whether the moving object 5 is present in the blind spot region based on the broadcast position information received in S402.

When the vehicle 1A determines that the moving object 5 is present in the blind spot region (S407: YES), in S408, the vehicle 1A outputs the information calling the first attention. For example, as illustrated in FIG. 15, the vehicle 1A displays the vehicle icon 501A and/or the pedestrian icon 501B on the HMI device 20.

When the vehicle 1A determines that the moving object 5 is not present in the blind spot region (S407: NO), the vehicle 1A ends the present process. That is, the vehicle 1A does not output the information calling the first attention. Alternatively, the vehicle 1A may display the information calling the second attention.

Figure 20:
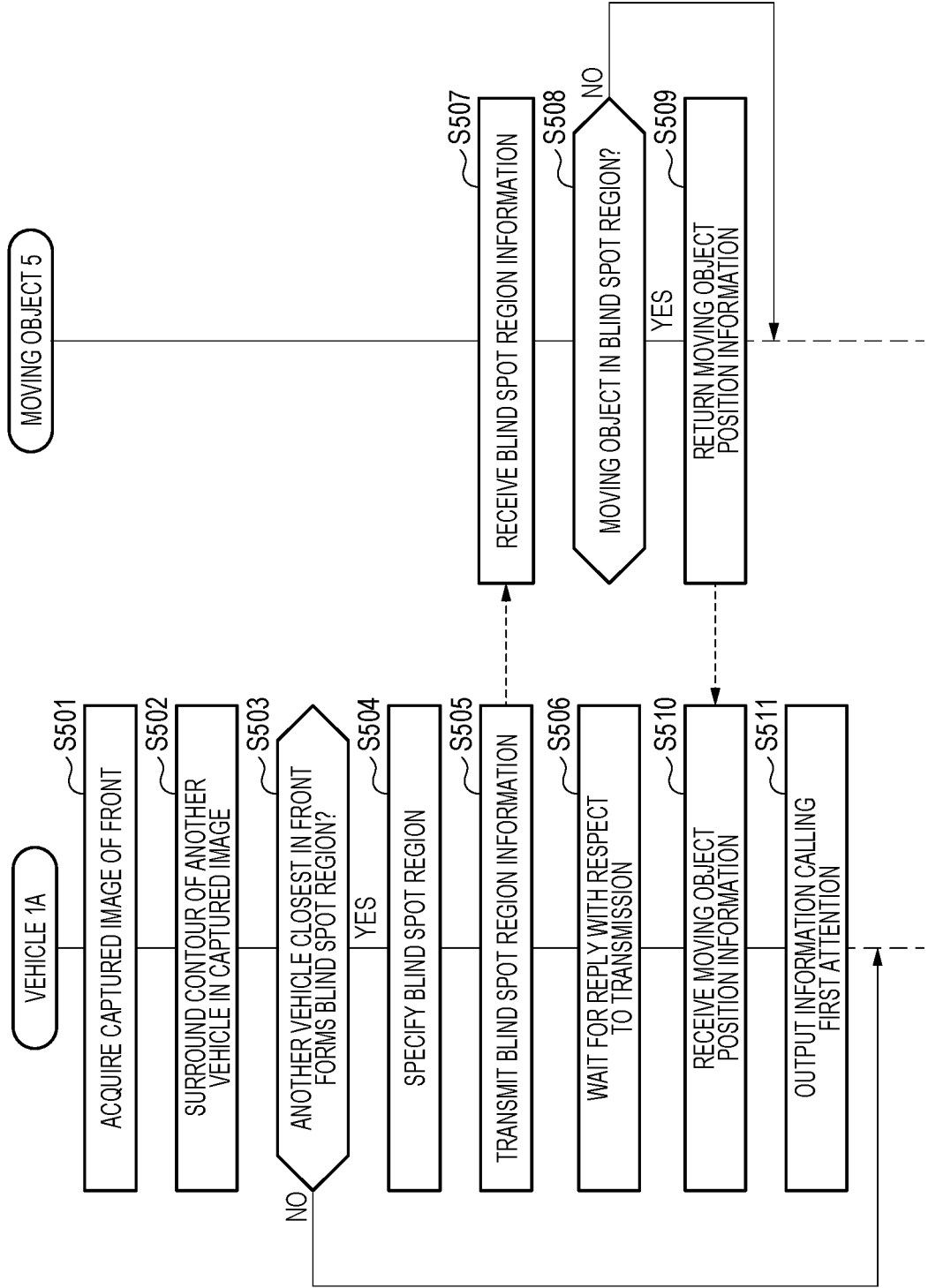
FIG. 20 is a flowchart showing an example of a process in a case in which the moving object according to the second embodiment determines whether the moving object is in the blind spot region of the vehicle 1A.

FIG. 20 is a flowchart showing an example of a process in a case in which the moving object 5 according to the second embodiment determines whether the moving object 5 is in the blind spot region of the vehicle 1A.

In S501, the vehicle 1A obtains the captured image of the front of the vehicle 1A through the camera device 12.

In S502, the vehicle 1A detects another vehicle from the captured image in S501, and surrounds a contour of the other vehicle (that is, the obstacle) with a rectangular frame.

In S503, the vehicle 1A determines whether another vehicle closest in the front (that is, an obstacle of which an obstacle distance is shortest) forms the blind spot region.

When the vehicle 1A determines that the other vehicle (that is, the obstacle) closest in the front does not form the blind spot region (S503: NO), the vehicle 1A ends the present process.

When the vehicle 1A determines that the other vehicle (that is, the obstacle) closest in the front forms the blind spot region (S503: YES), the vehicle 1A proceeds to a process of S504.

In S504, the blind spot region formed by the obstacle is specified.

In S505, the vehicle 1A transmits, through the V2X communication, the blind spot region information (see FIG. 16) indicating the blind spot region formed by the obstacle. Further, in S506, the vehicle 1A waits for a reply (feedback) of the moving object position information (see FIG. 17) from the moving object 5 with respect to the transmission in S505.

In S507, the moving object 5 receives the blind spot region information in S505.

In S508, the moving object 5 determines whether the position of the moving object is in the blind spot region indicated by the blind spot region information.

When the moving object 5 determines that the position of the moving object 5 is not in the blind spot region (S508: NO), the moving object 5 ends the present process. That is, the moving object 5 does not return (feed back) the moving object position information.

When the moving object 5 determines that the position of the moving object 5 is in the blind spot region (S508: YES), in S509, the moving object 5 returns (feeds back) the moving object position information (see FIG. 17) to the vehicle 1A through the V2X communication.

In S510, when the vehicle 1A receives the moving object position information in S509, the vehicle 1A proceeds to a process of S511.

In S511, the vehicle 1A outputs the information calling the first attention. For example, as illustrated in FIG. 15, the vehicle 1A displays the vehicle icon 501A and/or the pedestrian icon 501B on the HMI device 20.

When the vehicle 1A does not receive the moving object position information from any moving object 5, the vehicle 1A does not output the information calling the first attention. Alternatively, the vehicle 1A may output the information calling the second attention.

According to the process illustrated in FIG. 19 or 20, the information calling the first attention is displayed when the moving object 5 is present in the blind spot region, and the information calling the attention is not displayed when the moving object 5 is not present in the blind spot region. That is, it is possible to call attention of the driver with appropriate intensity. Accordingly, it is possible to prevent the driver from becoming accustomed to display of the information calling the attention due to the excessive display of the information calling the attention and reducing an effect of the display calling the attention.

Third Embodiment

A vehicle and a control device according to a third embodiment will be described. In the third embodiment, the same components as those in the first or second embodiment are denoted by the same reference numerals, and a description thereof may be omitted. A content described in the third embodiment may be implemented together with the content described in at least one of the first and second embodiments.

<Configuration of Device>

Figure 21:
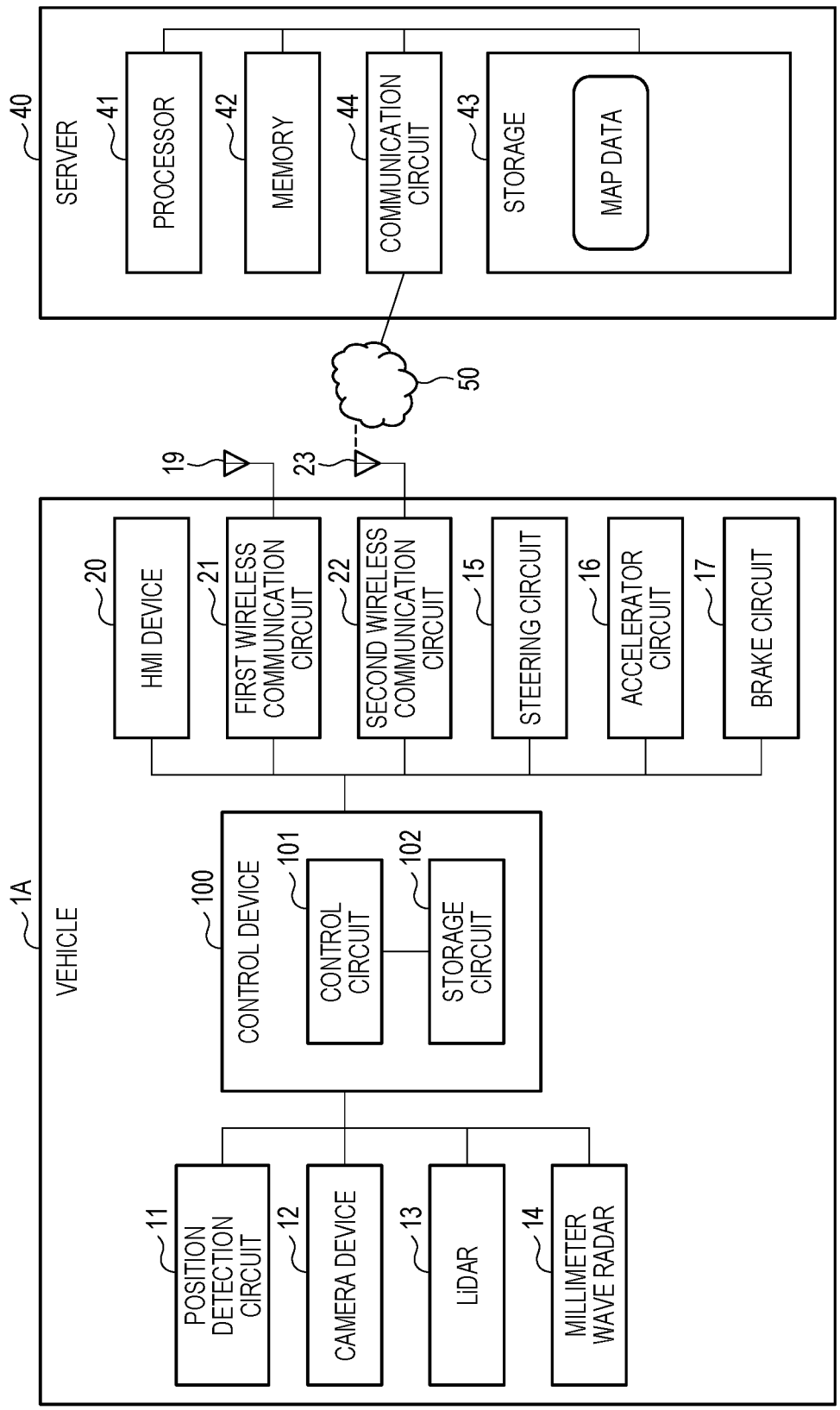
FIG. 21 is a block diagram showing an example of configurations of devices provided in the vehicle 1A and a server according to a third embodiment.
Figure 22:
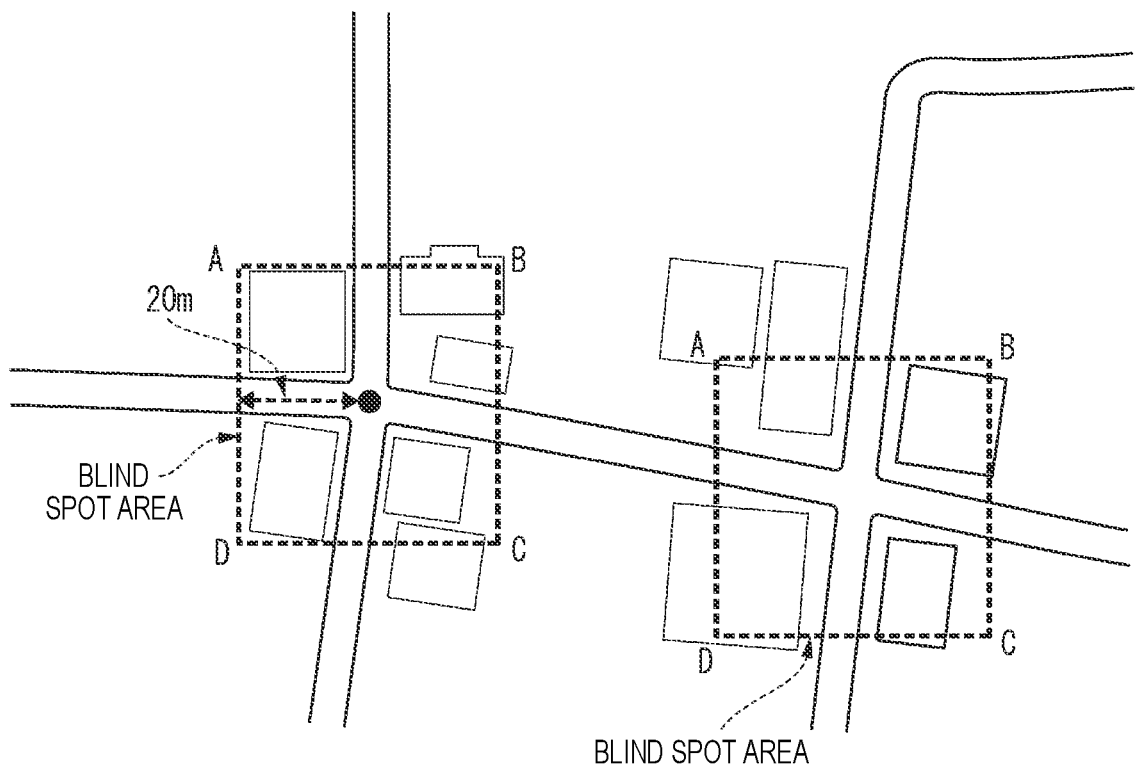
FIG. 22 is a schematic diagram illustrating a relationship between map data and a blind spot area according to the third embodiment.
Figure 23:
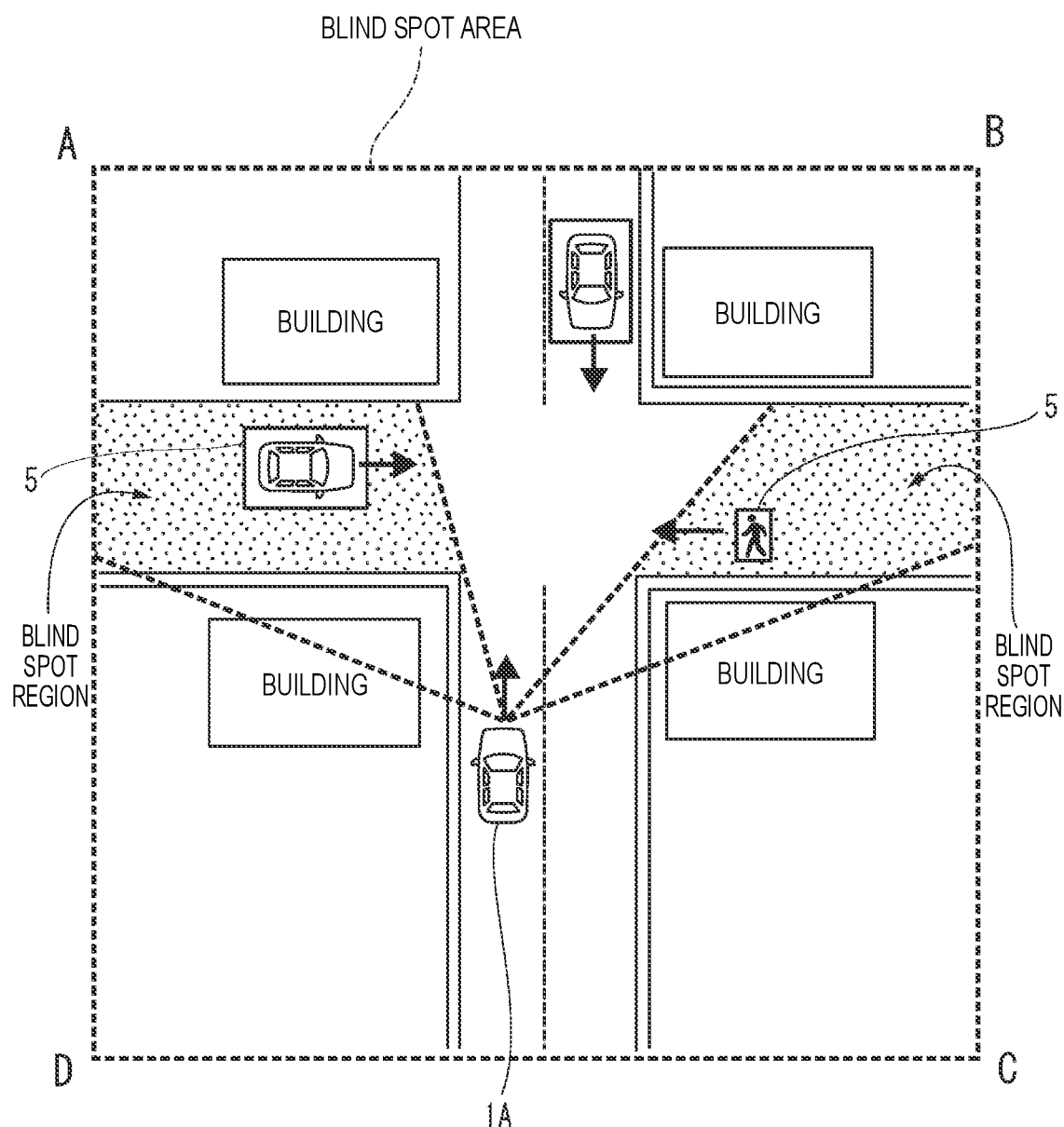
FIG. 23 is a schematic diagram illustrating the blind spot area and blind spot regions according to the third embodiment.

FIG. 21 is a block diagram showing an example of configurations of devices provided in the vehicle 1A and a server 40 according to the third embodiment. FIG. 22 is a schematic diagram illustrating a relationship between map data and a blind spot area according to the third embodiment. FIG. 23 is a schematic diagram illustrating the blind spot area and blind spot regions according to the third embodiment.

As illustrated in FIG. 11, the vehicle 1A includes the first wheels 2A and the second wheels 2B, and is movable in a predetermined direction using the first wheels 2A and the second wheels 2B. The predetermined direction may be read as a traveling direction of the vehicle 1A. The traveling direction is not limited to a direction of the straight traveling, and may include a direction of right turning and a direction of left turning.

As illustrated in FIG. 21, the vehicle 1A includes the position detection circuit 11, the camera device 12, the LiDAR 13, the millimeter wave radar 14, the steering circuit 15, the accelerator circuit 16, the brake circuit 17, a first wireless communication circuit 21, a second wireless communication circuit 22, the control device 100, and the HMI device 20.

The position detection circuit 11 detects a position of the vehicle 1A. The position of the vehicle 1A may be read as a first position.

The first wireless communication circuit 21 receives a position of another vehicle, a pedestrian, or the like through V2X communication. Hereinafter, the other vehicle, the pedestrian, or the like is referred to as the moving object 5. A position of the moving object 5 may be read as a second position.

A map data holding circuit is set to hold map data. The map data holding circuit may be configured by the storage circuit 102. The map data holding circuit may be configured by, for example, a RAM, a flash memory, or a combination thereof. The map data may include at least three-dimensional map data.

The output circuit is set so as to call attention. The output circuit is not limited to a circuit that simply outputs a signal, and may be a display circuit or a wireless communication circuit. The display circuit may be configured as, for example, the HMI device 20.

When the control circuit 101 determines that the second position is in a blind spot due to an obstacle in the map data with respect to the first position, the output circuit may output information calling first attention. The obstacle is, for example, buildings (for example, a multi-floor building, a house, or the like) or a wall (for example, a fence) present along a road.

When the control circuit 101 determines that the second position is not in the blind spot due to the obstacle in the map data with respect to the first position, the output circuit may output information calling second attention.

Intensity (hereinafter, referred to as first intensity) for calling the attention to the information calling the first attention may be stronger than intensity (hereinafter, referred to as second intensity) for calling the attention to the information calling the second attention. Output of the information calling the second attention may mean that no information is output, or may mean that very little information is output.

When the control circuit 101 determines that the second position is a position corresponding to a predetermined direction and the second position is in the blind spot due to the obstacle in the map data with respect to the first position, the output circuit may output the information calling the first attention. When the control circuit 101 determines that the second position is the position corresponding to the predetermined direction and is not in the blind spot due to the obstacle in the map data with respect to the first position, the output circuit may output the information calling the second attention.

The second wireless communication circuit 22 may be set to receive the map data. The first wireless communication circuit 21 and the second wireless communication circuit 22 may be an integrated wireless communication circuit.

Based on the first position and the map data, the control circuit 101 may set, as the blind spot region, a region that is the blind spot due to the obstacle in the map data with respect to the first position, and the first wireless communication circuit 21 may transmit the blind spot region. The moving object 5 that has received the blind spot region may transmit the second position when the moving object 5 is in the blind spot region. When the second position is in the blind spot due to the obstacle in the map data with respect to the first position, the output circuit may output the information calling the first attention. When the second position is not in the blind spot due to the obstacle in the map data with respect to the first position, the output circuit may output the information calling the second attention. At least a part of the blind spot region may include an intersection.

The output circuit is a display circuit, and at least the information calling the first attention output from the display circuit may include a predetermined image at a position corresponding to the second position in a display region of the display circuit.

The moving object may include at least a first communication device that can be carried by the pedestrian and a second communication device that can be installed in the vehicle. The first wireless communication circuit 21 may be further configured such that the moving object 5 receives a first communication device type corresponding to the first communication device and a second communication device type corresponding to the second communication device. When the first wireless communication circuit 21 receives the first communication device type, the information calling the first attention output from the display circuit may include a first image corresponding to the first communication device in the display region of the display circuit. When the first wireless communication circuit 21 receives the second communication device type, the information calling the first attention output by the display circuit may include a second image corresponding to the second communication device in the display region of the display circuit. Here, the first image and the second image may be different images.

When the control circuit 101 determines that the second position is in the blind spot due to the obstacle in the map data with respect to the first position, the output circuit may output the information calling the first attention. Thereafter, when the control circuit 101 determines that the second position is not in the blind spot due to the obstacle in the map data with respect to the first position, the output circuit may output information calling third attention. First intensity for calling the attention to the information calling the first attention may be stronger than third intensity for calling the attention to the information calling the third attention. Output of the information calling the third attention may mean that no information is output, or may mean that very little information is output.

Next, the server 40 will be described. The server 40 includes a processor 41, a memory 42, a storage 43, and a communication circuit 44. The server 40 achieves a function provided by the server 40 by reading and executing a computer program from the memory 42 or the storage 43. Further, the server 40 is connected to a communication network 50 via the communication circuit 44. The communication network 50 may be configured by a cellular network (for example, LTE, 4G, or 5G), the Internet, or a combination thereof.

The second wireless communication circuit 22 of the vehicle 1A may be connected to the communication network 50 through an antenna 23 provided in the vehicle 1A. Further, the second wireless communication circuit 22 may transmit and receive information to and from the server 40 through the communication network 50.

The server 40 manages the map data. The map data may be two-dimensional map data or three-dimensional map data. The server 40 may receive captured images of an outside of the vehicle from a large number of vehicles while the vehicle is traveling, and create three-dimensional map data using the received captured images.

As illustrated in FIG. 22, the server 40 sets the blind spot areas in the three-dimensional map data. For example, the server 40 sets the blind spot areas at intersections on which traffic lights of a residential street are not provided and visibility is poor due to a building, a wall, or the like. This is because, at such an intersection, the blind spot for the driver may be formed due to the buildings, the walls, or the like present along the road.

For example, as illustrated in FIG. 22, the blind spot area may be set to a range of m from a center of the intersection in directions of the north, the south, the east, and the west. Further, the blind spot area may be represented by positions of four vertices (vertices A, B, C, and D in FIG. 22) of a quadrangle that forms the blind spot area. The positions of the vertices A, B, C, and D may be represented by a set of latitude, longitude, and altitude.

The server 40 may transmit, to the vehicle 1A, dynamic map information (see FIG. 27) including setting of the blind spot area to the map data. At this time, when the vehicle 1A is in the blind spot area, the server 40 may add the information indicating the content in the dynamic map information and transmit the information. Accordingly, the vehicle 1A can recognize whether the vehicle 1A is in the blind spot area.

The process performed by the server 40 may be executed by edge computing (for example, a radio base station) present near the vehicle 1A. Further, the map data may be stored in the edge computing. Accordingly, a communication delay between the vehicle 1A and the server 40 can be reduced.

The vehicle 1A can receive the dynamic map information from the server 40 and determine whether the vehicle 1A is in the blind spot area. When the vehicle 1A is in the blind spot area, the vehicle 1A specifies the blind spot region for the driver. For example, the vehicle 1A calculates the blind spot regions as illustrated in FIG. 23, based on positions, sizes, and the like of obstacles such as buildings or walls in the map data received from the server 40.

Further, the vehicle 1A determines whether the moving object 5 is present in the blind spot region. For example, the vehicle 1A receives information indicating the position of the moving object 5 from the moving object 5 or the server 40, and determines whether the position of the moving object 5 is in the blind spot region. When the moving object 5 is in the blind spot region, the vehicle 1A may display the information calling the first attention. Next, a display example of the information calling the first attention will be described.

<Display Example of Information Calling Attention>

Figure 24:
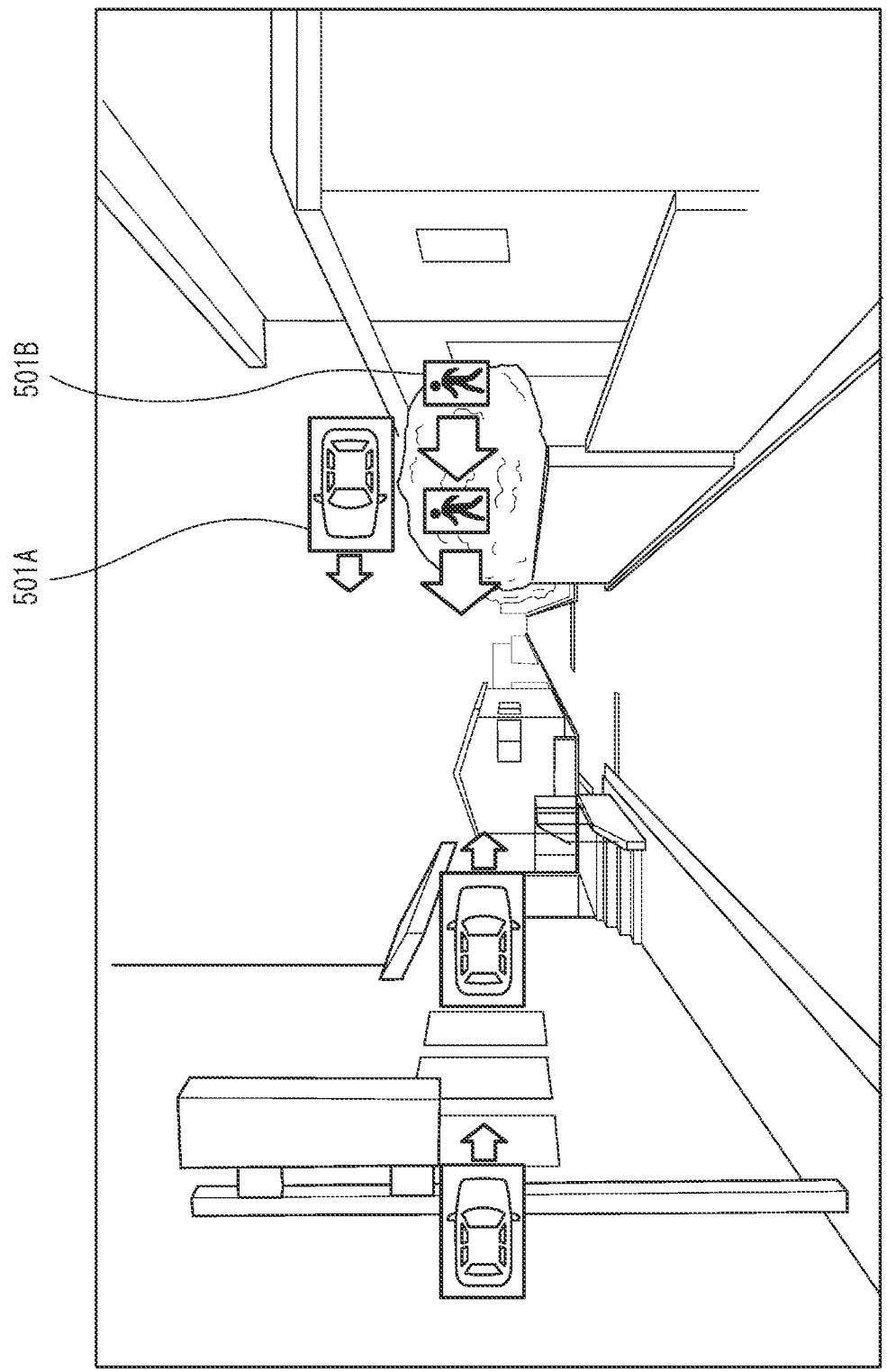
FIG. 24 is a diagram showing a first example in which an image of a moving object present in the blind spot region is displayed on an HMI device according to the third embodiment.

FIG. 24 is a diagram showing a first example in which an image of the moving object 5 present in the blind spot region is displayed on the HMI device 20 according to the third embodiment.

When the moving object 5 enters the blind spot area and is present in the blind spot region, as an example of the information calling the first attention, as illustrated in FIG. 24, the control circuit 101 of the vehicle 1A may display, on the HMI device 20, an image indicating the position of the moving object 5 present in the blind spot region and a traveling direction of the moving object 5 in accordance with the position of the intersection in the captured image. Here, when the moving object 5 is present in a blind spot region on a right front side as viewed from the driver, the image of the moving object 5 may be displayed at a position on a right side of the intersection in the captured image. Here, when the moving object 5 is present in a blind spot region on a left front side as viewed from the driver, the image of the moving object 5 may be displayed at a position on a left side of the intersection in the captured image.

When the moving object 5 is another vehicle, the vehicle icon 501A may be displayed as an example of a second image, and when the moving object 5 is a pedestrian, the pedestrian icon 501B may be displayed as an example of a first image. Further, the traveling direction of the moving object 5 may be indicated by an arrow. Further, when the HMI device 20 is a HUD, the control circuit 101 may display the vehicle icon 501A and/or the pedestrian icon 501B in accordance with the position of the intersection viewed through the HUD.

Figure 25:
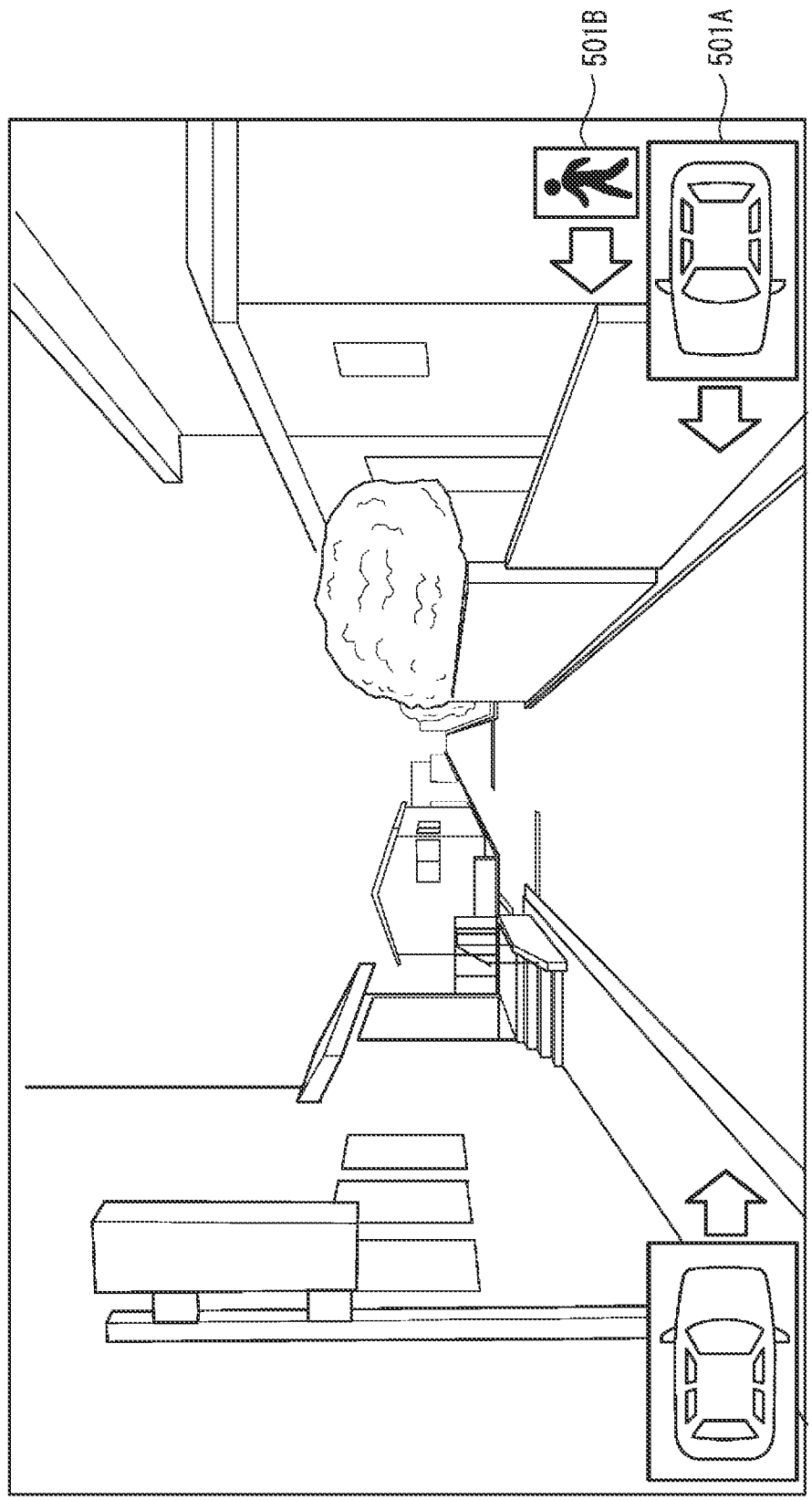
FIG. 25 is a diagram showing a second example in which the image of the moving object present in the blind spot region is displayed on the HMI device according to the third embodiment.

FIG. 25 is a diagram showing a second example in which the image of the moving object 5 present in the blind spot region is displayed on the HMI device 20 according to the third embodiment.

When the moving object 5 enters the blind spot area and is present in the blind spot region, as an example of the information calling the first attention, as illustrated in FIG. 25, the control circuit 101 of the vehicle 1A may display, at a lower end of the captured image on the HMI device 20, the image indicating the position of the moving object 5 present in the blind spot region and the traveling direction of the moving object 5. Here, when the moving object 5 is present in the blind spot region on the right front side as viewed from the driver, the image of the moving object 5 may be displayed at a lower right end of the captured image. Here, when the moving object 5 is present in the blind spot region on the left front side as viewed from the driver, the image of the moving object 5 may be displayed at a lower left end of the captured image.

When the moving object 5 is another vehicle, the vehicle icon 501A may be displayed as an example of a second image, and when the moving object 5 is a pedestrian, the pedestrian icon 501B may be displayed as an example of a first image. Further, the traveling direction of the moving object 5 may be indicated by an arrow. When the HMI device 20 is the HUD, the control circuit 101 may display the vehicle icon 501A and/or the pedestrian icon 501B at a lower end of the HUD.

<V2X Communication Format>

FIG. 26 is a diagram showing an example of a V2X communication format of vehicle position information according to the third embodiment.

The vehicle position information is used when the vehicle 1A transmits information indicating a position or the like thereof to the moving object 5 or the server 40 through V2X communication.

As illustrated in FIG. 26, the vehicle position information may include the position of the vehicle 1A, a traveling direction of the vehicle 1A, a speed of the vehicle 1A, and V2X communication terminal ID of the vehicle 1A.

The position of the vehicle 1A may be calculated by the position detection circuit 11. The position of the vehicle 1A may be represented by a set of longitude, latitude, and altitude.

The traveling direction of the vehicle 1A may be calculated based on a steering angle of a steering wheel in a steering circuit. The traveling direction of the vehicle 1A may be represented by an azimuth, or may be expressed by 360-degree azimuth angles, in which the north is 0 degrees (or 360 degrees), the east is 90 degrees, the south is 180 degrees, and the west is 270 degrees.

The speed of the vehicle 1A may be calculated by a predetermined speed measurement device provided in the vehicle.

The V2X communication terminal ID of the vehicle 1A is an ID for identifying the vehicle 1A in the V2X communication.

FIG. 27 is a diagram showing an example of a V2X communication format of dynamic map information according to the third embodiment.

The dynamic map information is used when the server 40 transmits the map data including the blind spot area and the like to the vehicle or the moving object 5 through the V2X communication.

As illustrated in FIG. 27, the dynamic map information may include at least one blind spot area information. In addition, the dynamic map information may include at least one piece of road information, at least one piece of intersection information, and at least one danger flag.

The blind spot area information may include a blind spot flag indicating whether the vehicle 1A that is a transmission source of the vehicle position information is in the blind spot area, and position information indicating the blind spot area.

For example, the blind spot flag=0 indicates that the vehicle 1A is not in the blind spot area, and the blind spot flag=1 indicates that the vehicle 1A is in the blind spot area.

When the vehicle 1A, instead of the server 40, determines whether the vehicle 1A is in the blind spot area (see FIG. 30), the blind spot area information may not include the blind spot flag.

For example, the position information indicating the blind spot area may include positions of four vertices (vertices A, B, C, and D in FIG. 23) of a quadrangle that forms the blind spot area. Each of the positions of the four vertices may be represented by a set of the latitude, the longitude, and the altitude.

The road information may include information such as a direction of a road, a width of the road, or one-way traffic in the blind spot area.

The intersection information may include information related to the intersection in the blind spot area.

For example, the danger flag of "0" indicates that the blind spot area is less dangerous, and the danger flag of "1" indicates that the blind spot area is dangerous. For example, the danger flag may be "1" when the road in the blind spot area is very narrow, there is a dead end, or there is an entrance-forbidden area.

FIG. 28 is a diagram showing an example of a V2X communication format of moving object position information according to the third embodiment.

The moving object position information is used when the moving object 5 transmits the information indicating the position or the like thereof to the vehicle 1A or the server 40 through the V2X communication.

As illustrated in FIG. 28, the moving object position information may include the position of the moving object 5, the traveling direction of the moving object 5, a speed of the moving object 5, and a V2X communication terminal ID of the moving object 5.

The position, the traveling direction, and the speed of the moving object 5 may be calculated in the same manner as the position, the traveling direction, and the speed of the vehicle 1A described above. When the moving object 5 is a pedestrian, the traveling direction and the speed of the moving object 5 may be measured by a predetermined sensor (for example, an acceleration sensor, a gyro sensor, or a magnetic sensor) provided in a terminal of the moving object 5.

FIG. 29 is a diagram showing an example of a V2X communication format of broadcast position information according to the third embodiment.

The broadcast position information is used when the vehicle or the moving object 5 broadcasts the information indicating the position and the like of the vehicle or the moving object 5 to surroundings through the V2X communication.

As illustrated in FIG. 29, the broadcast position information may include the position of the vehicle or the moving object 5, the traveling direction of the vehicle or the moving object 5, and the speed of the vehicle or the moving object 5.

<Flowchart>

Figure 30:
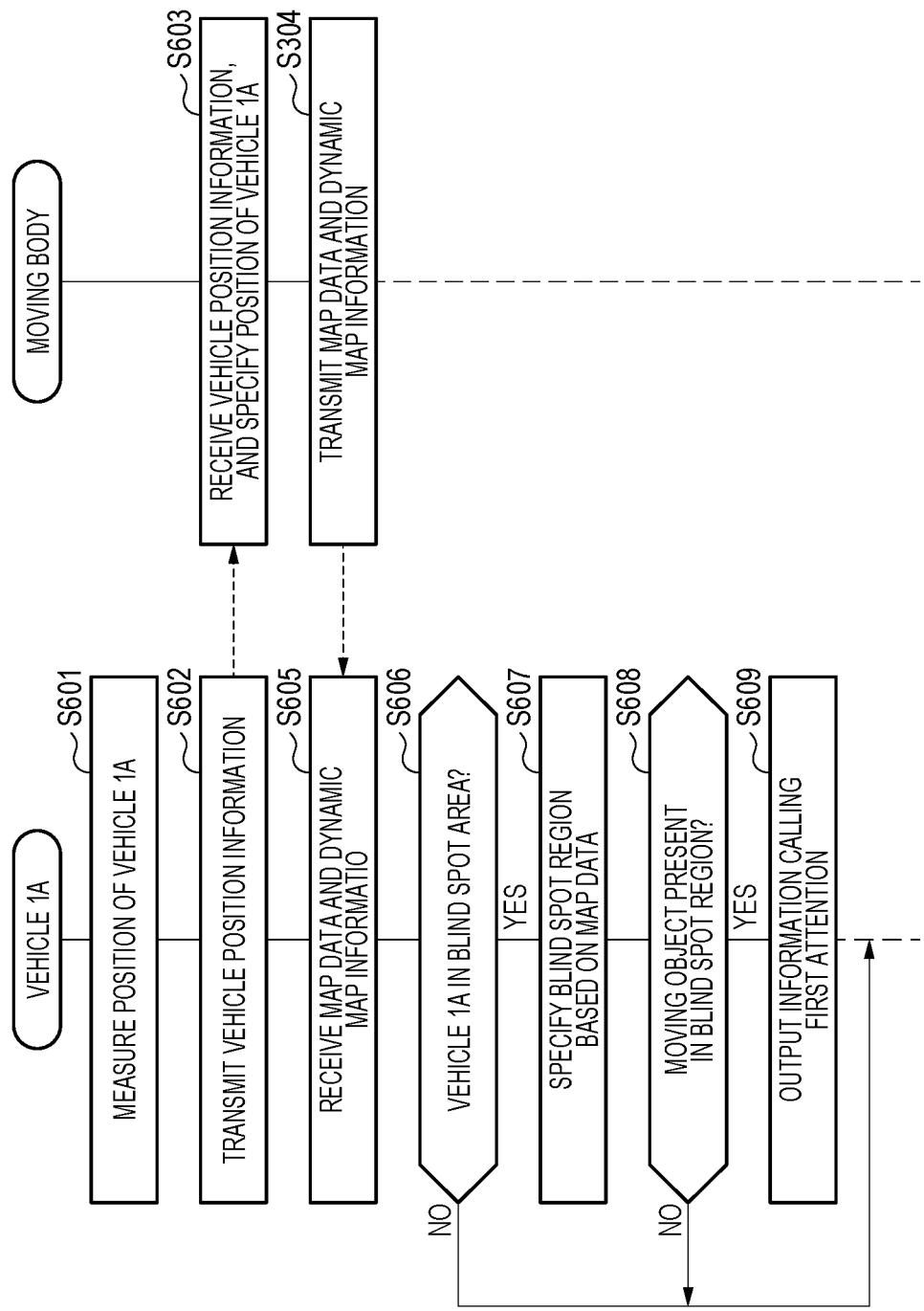
FIG. 30 is a flowchart showing an example of a process in a case in which the vehicle 1A according to the third embodiment determines whether the vehicle 1A is in the blind spot area.

FIG. 30 is a flowchart showing an example of a process in a case in which the vehicle 1A according to the third embodiment determines whether the vehicle 1A is in the blind spot area.

In S601, the vehicle 1A measures the position of the vehicle 1A.

In S602, the vehicle 1A transmits, to the server 40, the vehicle position information including the position of the vehicle 1A measured in S601 through the V2X communication.

In S603, the server 40 receives the vehicle position information in S602, and specifies the position of the vehicle 1A with reference to the vehicle position information.

In S604, the server 40 transmits, to the vehicle 1A, the surrounding map data including the position of the vehicle 1A and the dynamic map information related to the map data through the V2X communication.

In S605, the vehicle 1A receives the map data and the dynamic map information in S604.

In S606, the vehicle 1A determines whether the vehicle 1A is in the blind spot area based on the received dynamic map information. For example, the vehicle 1A determines whether the position of the vehicle 1A is in the blind spot area based on the position information indicating the blind spot area in the blind spot area information of the dynamic map information.

When the vehicle 1A determines that the position of the vehicle 1A is not in the blind spot area (S606: NO), the vehicle 1A ends the present process.

When the vehicle 1A determines that the position of the vehicle 1A is in the blind spot area (S606: YES), the vehicle 1A proceeds to a process of S607.

In S607, the vehicle 1A specifies the blind spot region viewed from the vehicle 1A based on a position, a size, and the like of the obstacle in the blind spot area in the map data.

In S608, the vehicle 1A determines whether the moving object 5 is present in the blind spot region. For example, the vehicle 1A receives the moving object position information or the broadcast position information from the moving object 5 by the V2X communication, and specifies the position of the moving object 5. Further, the vehicle 1A determines whether the position of the moving object 5 is in the blind spot region.

When the vehicle 1A determines that the moving object 5 is not present in the blind spot region (S608: NO), the vehicle 1A ends the present process. That is, the vehicle 1A does not output the information calling the first attention. Alternatively, the vehicle 1A may output the information calling the second attention.

When the vehicle 1A determines that the moving object 5 is present in the blind spot region (S608: YES), the vehicle 1A outputs the information calling the first attention in S609. For example, as illustrated in FIG. 24 or FIG. 25, the vehicle 1A displays the vehicle icon 501A and/or the pedestrian icon 501B on the HMI device 20.

FIG. 31 is a flowchart illustrating an example of a process in a case in which the server 40 determines whether the vehicle 1A according to the third embodiment is in the blind spot area.

In S701, the vehicle 1A measures the position of the vehicle 1A.

In S702, the vehicle 1A transmits, to the server 40, the vehicle position information including the position of the vehicle 1A measured in S701 through the V2X communication.

In S703, the server 40 receives the vehicle position information in S702, and specifies the position of the vehicle 1A with reference to the vehicle position information.

In S704, the server 40 determines whether the position of the vehicle 1A is in the blind spot area.

When the position of the vehicle 1A is in the blind spot area, in S705, the server 40 transmits, to the vehicle 1A, the map data around the vehicle 1A, the dynamic map information including the blind spot flag (blind spot flag=1) indicating that the vehicle 1A is in the blind spot area, and the moving object position information of the moving object 5 present in the blind spot area through the V2X communication. It is assumed that the moving object 5 transmits the moving object position information to the server 40 at any time.

When the position of the vehicle 1A is not in the blind spot area (S704: NO), in S706, the server 40 transmits, to the vehicle 1A, the map data around the vehicle 1A and the dynamic map information including the blind spot flag (blind spot flag=0) indicating that the vehicle 1A is not in the blind spot area through the V2X communication.

In S707, the vehicle 1A receives, from the server 40 through the V2X communication, the map data and the dynamic map information transmitted in S705 or S706.

In S708, the vehicle 1A refers to the blind spot flag of the dynamic map information, and determines whether the vehicle 1A is in the blind spot area.

When the vehicle 1A determines that the position of the vehicle 1A is not in the blind spot area (S708: NO), the vehicle 1A ends the present process. That is, the vehicle 1A does not display the information calling attention. Alternatively, the vehicle 1A may display the information calling the second attention.

When the vehicle 1A determines that the position of the vehicle 1A is in the blind spot area (S708: YES), the process proceeds to S709.

In S709, the vehicle 1A specifies the blind spot region viewed from the vehicle 1A based on the position, the size, and the like of the obstacle in the blind spot area in the map data.

In S710, the vehicle 1A determines whether the moving object 5 is present in the blind spot region. For example, the vehicle 1A determines whether the moving object 5 is present in the blind spot region using the moving object position information received from the server 40 in S707.

When the vehicle 1A determines that the moving object 5 is not present in the blind spot region (S710: NO), the vehicle 1A ends the present process. That is, the vehicle 1A does not display the information calling the first attention. Alternatively, the vehicle 1A may display the information calling the second attention.

When the vehicle 1A determines that the moving object 5 is present in the blind spot region (S710: YES), the vehicle 1A outputs the information calling the first attention in S711. For example, as illustrated in FIG. 24 or FIG. 25, the vehicle 1A displays the vehicle icon 501A and/or the pedestrian icon 501B on the HMI device 20.

In the process illustrated in FIG. 30 or 31, when the vehicle 1A does not enter the blind spot area (that is, when the vehicle 1A exits from the blind spot area), the HMI device of the vehicle 1A may hide the information calling the first attention. Alternatively, the HMI device 20 of the vehicle 1A may display the information calling the third attention. The intensity (first intensity) for calling the attention to the information calling the first attention described above may be stronger than the intensity (third intensity) for calling the attention to the information calling the third attention.

According to the process illustrated in FIG. 30 or 31, the information calling the first attention is displayed when the vehicle 1A is in the blind spot area and the moving object is present in the blind spot region, and the information calling the attention is not displayed when the vehicle 1A is not in the blind spot area. That is, it is possible to call attention of the driver with appropriate intensity. Accordingly, it is possible to prevent the driver from becoming accustomed to the display of the information calling the attention due to the excessive display of the information calling the attention and reducing an effect of displaying the information calling the attention.

Although embodiments have been described above with reference to the accompanying drawings, the present disclosure is not limited thereto. It is obvious to those skilled in the art that various changes, modifications, replacements, additions, deletions, and equivalents can be conceived within the scope described in the claims, and it is understood that these also belong to the technical scope of the present disclosure. In addition, components in the embodiments described above may be combined freely in a range without deviating from the spirit of the invention.

(A-1)

A vehicle including:
a first wheel and a second wheel;
a steering circuit configured to steer at least one of the first wheel and the second wheel; and
a wireless communication circuit configured to wirelessly communicate with the first vehicle and the second vehicle, in which
when the wireless communication circuit receives a scheduled route of the first vehicle from the first vehicle while the vehicle is traveling on a first scheduled route, and determines that a possibility of a collision with the first vehicle is equal to or greater than a certain value based on the first scheduled route and the scheduled route of the first vehicle,
the vehicle creates a second scheduled route different from the first scheduled route, starts traveling on the second scheduled route, and transmits the scheduled route of the first vehicle and the second scheduled route to the second vehicle.

(A-2)

The vehicle according to A-1, further including:
a control circuit.

(A-3)

The vehicle according to A-1 or A-2, in which
the possibility of the collision with the first vehicle, which is determined based on the first scheduled route and the scheduled route of the first vehicle, is set as a first possibility,
a possibility of the collision with the first vehicle, which is determined based on the second scheduled route and the scheduled route of the first vehicle, is set as a second possibility, and
the second possibility is lower than the first possibility.

(A-4)

The vehicle according to any one of A-1 to A-3, in which
the second scheduled route is a route on which the vehicle avoids the collision with the first vehicle.

(A-5)

The vehicle according to any one of A-1 to A-4, in which
the second vehicle that has received the scheduled route of the first vehicle and the second scheduled route is capable of performing control based on the scheduled route of the first vehicle and the second scheduled route.

(A-6)

The vehicle according to any one of A-1 to A-5, in which
the scheduled route of the first vehicle includes at least one piece of position information and at least one piece of direction information.

(A-7)
The vehicle according to any one of A-1 to A-6, in which each of the first scheduled route and the second scheduled route includes at least one piece of position information and at least one piece of direction information.

(A-8)
The vehicle according to any one of A-1 to A-7, further including:
a position information detection circuit configured to acquire position information.

(A-9)
The vehicle according to any one of A-1 to A-8, in which the steering circuit performs steering with respect to the at least one of the first wheel and the second wheel based on the first scheduled route and the second scheduled route.

(A-10)
The vehicle according to any one of A-1 to A-9, further including:
a drive portion configured to drive the at least one of the first wheel and the second wheel.

(A-11)
A control device mountable on a vehicle including a first wheel and a second wheel, a steering circuit configured to steer at least one of the first wheel and the second wheel, and a wireless communication circuit configured to wirelessly communicate with the first vehicle and the second vehicle, in which
when the wireless communication circuit receives a scheduled route of the first vehicle from the first vehicle while the vehicle is traveling on a first scheduled route, and determines that a possibility of a collision with the first vehicle is equal to or greater than a certain value based on the first scheduled route and the scheduled route of the first vehicle,
the control device creates a second scheduled route different from the first scheduled route, starts traveling on the second scheduled route, and transmits the scheduled route of the first vehicle and the second scheduled route to the second vehicle.

(A-12)
The control device according to A-11, further including:
a control circuit.

(A-13)
The control device according to A-11 or A-12, in which
the possibility of the collision with the first vehicle, which is determined based on the first scheduled route and the scheduled route of the first vehicle, is set as a first possibility,
a possibility of the collision with the first vehicle, which is determined based on the second scheduled route and the scheduled route of the first vehicle, is set as a second possibility, and
the second possibility is lower than the first possibility.

(A-14)
The control device according to any one of A-11 to A-13, in which
the second scheduled route is a route on which the vehicle avoids the collision with the first vehicle.

(A-15)
The control device according to any one of A-11 to A-14, in which
the second vehicle that has received the scheduled route of the first vehicle and the second scheduled route is capable of performing control based on the scheduled route of the first vehicle and the second scheduled route.

(A-16)
The control device according to any one of A-11 to A-15, in which
the scheduled route of the first vehicle includes at least one piece of position information and at least one piece of direction information.

(A-17)
The control device according to any one of A-11 to A-16, in which
each of the first scheduled route and the second scheduled route includes at least one piece of position information and at least one piece of direction information.

(A-18)
The control device according to any one of A-11 to A-17, further including:
a position information detection circuit configured to acquire position information.

(A-19)
The control device according to any one of A-11 to A-18, in which
the steering circuit performs steering with respect to the at least one of the first wheel and the second wheel based on the first scheduled route and the second scheduled route.

(A-20)
The control device according to any one of A-11 to A-19, in which
the vehicle further includes a drive portion configured to drive the at least one of the first wheel and the second wheel.

(B-1)
A vehicle including a first wheel and a second wheel and movable in a predetermined direction using the first wheel and the second wheel, the vehicle including:
a position detection circuit configured to detect a first position of the vehicle;
a wireless communication circuit configured to receive a second position of a moving object;
a map data holding circuit configured to hold map data; and
an output circuit set configured to output information calling attention, in which
when the second position is in a blind spot due to an obstacle in the map data with respect to the first position, the output circuit outputs information calling first attention,
when the second position is not in the blind spot due to the obstacle in the map data with respect to the first position, the output circuit outputs information calling second attention, and
first intensity for calling attention to the information calling the first attention is stronger than second intensity for calling attention to the information calling the second attention.

(B-2)
The vehicle according to B-1, in which
when the second position is a position corresponding to the predetermined direction and the second position is in the blind spot due to the obstacle in the map data with respect to the first position, the output circuit outputs the information calling the first attention, and
when the second position is a position corresponding to the predetermined direction and is not in the blind spot due to the obstacle in the map data with respect to the first position, the output circuit outputs the information calling the second attention.

(B-3)
  The vehicle according to B-1 or B-2, in which
  the output of the information calling the second attention means that nothing is output.
(B-4)
  The vehicle according to any one of B-1 to B-3, in which
  the wireless communication circuit is set as a first wireless communication circuit, and
  the vehicle further includes a second wireless communication circuit configured to receive the map data.
(B-5)
  The vehicle according to any one of B-1 to B-4, in which
  the map data includes at least three-dimensional map data.
(B-6)
  The vehicle according to any one of B-1 to B-5, in which
  based on the first position and the map data, a region that is a blind spot due to the obstacle in the map data is set as a blind spot region with respect to the first position,
  the wireless communication circuit transmits the blind spot region,
  the moving object that has received the blind spot region transmits the second position when the moving object is in the blind spot region,
  when the second position is in the blind spot due to the obstacle in the map data with respect to the first position, the output circuit outputs the information calling the first attention, and
  when the second position is not in the blind spot due to the obstacle in the map data with respect to the first position, the output circuit outputs the information calling the second attention.
(B-7)
  The vehicle according to B-6, in which
  at least a part of the blind spot region includes an intersection.
(B-8)
  The vehicle according to any one of B-1 to B-7, in which
  the output circuit is a display circuit, and
  at least the information calling the first attention output from the display circuit includes a predetermined image at a position corresponding to the second position in a display region of the display circuit.
(B-9)
  The vehicle according to any one of B-1 to B-7, in which
  the output circuit is a display circuit,
  the moving object includes at least a first communication device configured to be carried by a pedestrian and a second communication device configured to be provided on the vehicle,
  the wireless communication circuit is further configured to receive a first communication device type corresponding to the first communication device by the moving object and a second communication device type corresponding to the second communication device by the moving object,
  when the wireless communication circuit receives the first communication device type, the information calling the first attention output from the display circuit includes a first image corresponding to the first communication device in a display region of the display circuit, and
  when the wireless communication circuit receives the second communication device type, the information calling the first attention output from the display circuit includes a second image corresponding to the second communication device in the display region of the display circuit.
(B-10)
  The vehicle according to any one of B-1 to B-9, in which
  when the second position is in the blind spot due to the obstacle in the map data with respect to the first position, the output circuit outputs the information calling the first attention,
  thereafter, when the second position is not in the blind spot due to the obstacle in the map data with respect to the first position, the output circuit outputs information calling third attention, and
  the first intensity for calling the attention to the information calling the first attention is stronger than third intensity for calling attention to the information calling the third attention.
(B-11)
  A control device configured to be mounted on a vehicle including a first wheel and a second wheel, movable in a predetermined direction using the first wheel and the second wheel, and further including a position detection circuit configured to detect a first position of the vehicle, and a wireless communication circuit configured to receive a second position of a moving object, the control device including:
  a map data holding circuit configured to hold map data;
  an output circuit configured to output information calling attention, in which
  when the second position is in a blind spot due to an obstacle in the map data with respect to the first position, the output circuit outputs information calling first attention,
  when the second position is not in the blind spot due to the obstacle in the map data with respect to the first position, the output circuit outputs information calling second attention, and
  first intensity for calling attention to the information calling the first attention is stronger than second intensity for calling attention to the information calling the second attention.
(B-12)
  The control device according to B-11, in which
  when the second position is a position corresponding to the predetermined direction and the second position is in the blind spot due to the obstacle in the map data with respect to the first position, the output circuit outputs the information calling the first attention, and
  when the second position is a position corresponding to the predetermined direction and is not in the blind spot due to the obstacle in the map data with respect to the first position, the output circuit outputs the information calling the second attention.
(B-13)
  The control device according to B-11 or B-12, in which
  the output of the information calling the second attention means that nothing is output.
(B-14)
  The control device according to any one of B-11 to B-13, in which
  the wireless communication circuit is set as a first wireless communication circuit, and
  the vehicle further includes a second wireless communication circuit configured to receive the map data.
(B-15)
  The control device according to any one of B-11 to B-14, in which
  the map data includes at least three-dimensional map data.

(B-16)

The control device according to any one of B-11 to B-15, in which based on the first position and the map data, a blind spot region that is the blind spot due to the obstacle in the map data with respect to the first position is generated, the wireless communication circuit transmits the blind spot region, the moving object that has received the blind spot region transmits the second position when the moving object is in the blind spot region, when the second position is in the blind spot due to the obstacle in the map data with respect to the first position, the output circuit outputs the information calling the first attention, and when the second position is not in the blind spot due to the obstacle in the map data with respect to the first position, the output circuit outputs the information calling the second attention.

(B-17)

The control device according to B-16, in which at least a part of the blind spot region includes an intersection.

(B-18)

The control device according to any one of B-11 to B-17, in which the output circuit is configured to be connected to a display circuit, and the information calling the first attention output from the display circuit includes a predetermined image at a position corresponding to the second position in a display region of the display circuit.

(B-19)

The control device according to any one of B-11 to B-17, in which the output circuit is configured to be connected to a display circuit, the moving object includes at least a first communication device configured to be carried by a pedestrian and a second communication device configured to be provided on the vehicle, the wireless communication circuit is further configured to receive a first communication device type corresponding to the first communication device by the moving object and a second communication device type corresponding to the second communication device by the moving object, when the wireless communication circuit receives the first communication device type, the information calling the first attention output from the display circuit includes a first image corresponding to the first communication device in a display region of the display circuit, and when the wireless communication circuit receives the second communication device type, the information calling the first attention output from the display circuit includes a second image corresponding to the second communication device in the display region of the display circuit.

(B-20)

The control device according to any one of B-11 to B-19, in which when the second position is in the blind spot due to the obstacle in the map data with respect to the first position, the output circuit outputs the information calling the first attention, thereafter, when the second position is not in the blind spot due to the obstacle in the map data with respect to the first position, the output circuit outputs information calling third attention, and the first intensity for calling the attention to the information calling the first attention is stronger than third intensity for calling attention to the information calling the third attention.

The present application is based on Japan patent application (Japanese Patent Application No. 2020-200523) filed on Dec. 2, 2020, Japanese patent application (Japanese Patent Application No. 2021-21156) filed on Feb. 12, 2021, and Japanese patent application (Japanese Patent Application No. 2021-21157) filed on Feb. 12, 2021, and the contents of which are incorporated herein by reference.

INDUSTRIAL APPLICABILITY

The technique of the present disclosure is useful for improving safety of driving a vehicle.

The invention claimed is:

1. A vehicle comprising:
a first wheel and a second wheel;
a steering circuit configured to steer at least one of the first wheel and the second wheel; and
a wireless communication circuit configured to wirelessly communicate with a first vehicle and the second vehicle,
wherein when the wireless communication circuit receives a scheduled route of the first vehicle from the first vehicle while the vehicle is traveling on a first scheduled route, and determines that a possibility of a collision with the first vehicle is equal to or greater than a certain value based on the first scheduled route and the scheduled route of the first vehicle,
the vehicle creates a second scheduled route different from the first scheduled route, starts traveling on the second scheduled route, and transmits the scheduled route of the first vehicle and the second scheduled route to the second vehicle.

2. The vehicle according to claim 1, further comprising:
a control circuit.

3. The vehicle according to claim 1, wherein
the possibility of the collision with the first vehicle, which is determined based on the first scheduled route and the scheduled route of the first vehicle, is set as a first possibility,
a possibility of the collision with the first vehicle, which is determined based on the second scheduled route and the scheduled route of the first vehicle, is set as a second possibility, and
the second possibility is lower than the first possibility.

4. The vehicle according to claim 1, wherein
the second scheduled route is a route on which the vehicle avoids the collision with the first vehicle.

5. The vehicle according to claim 1, wherein
the second vehicle that has received the scheduled route of the first vehicle and the second scheduled route is capable of performing control based on the scheduled route of the first vehicle and the second scheduled route.

6. The vehicle according to claim 1, wherein
the scheduled route of the first vehicle includes at least one piece of position information and at least one piece of direction information.

7. The vehicle according to claim 1, wherein
each of the first scheduled route and the second scheduled route includes at least one piece of position information and at least one piece of direction information.

8. The vehicle according to claim 1, further comprising:
a position detection circuit configured to acquire position information.

9. The vehicle according to claim 1, wherein
the steering circuit performs steering with respect to the at least one of the first wheel and the second wheel based on the first scheduled route and the second scheduled route.

10. The vehicle according to claim 1, further comprising:
a drive portion configured to drive the at least one of the first wheel and the second wheel.

11. A control device mountable on a vehicle including a first wheel and a second wheel, a steering circuit configured to steer at least one of the first wheel and the second wheel, and a wireless communication circuit configured to wirelessly communicate with a first vehicle and a second vehicle, wherein
when the wireless communication circuit receives a scheduled route of the first vehicle from the first vehicle while the vehicle is traveling on a first scheduled route, and determines that a possibility of a collision with the first vehicle is equal to or greater than a certain value based on the first scheduled route and the scheduled route of the first vehicle,
the control device creates a second scheduled route different from the first scheduled route, starts traveling on the second scheduled route, and transmits the scheduled route of the first vehicle and the second scheduled route to the second vehicle.

12. The control device according to claim 11, further comprising:
a control circuit.

13. The control device according to claim 11, wherein
the possibility of the collision with the first vehicle, which is determined based on the first scheduled route and the scheduled route of the first vehicle, is set as a first possibility,
a possibility of the collision with the first vehicle, which is determined based on the second scheduled route and the scheduled route of the first vehicle, is set as a second possibility, and
the second possibility is lower than the first possibility.

14. The control device according to claim 11, wherein
the second scheduled route is a route on which the vehicle avoids the collision with the first vehicle.

15. The control device according to claim 11, wherein
the second vehicle that has received the scheduled route of the first vehicle and the second scheduled route is capable of performing control based on the scheduled route of the first vehicle and the second scheduled route.

16. The control device according to claim 11, wherein
the scheduled route of the first vehicle includes at least one piece of position information and at least one piece of direction information.

17. The control device according to claim 11, wherein
each of the first scheduled route and the second scheduled route includes at least one piece of position information and at least one piece of direction information.

18. The control device according to claim 11, further comprising:
a position detection circuit configured to acquire position information.

19. The control device according to claim 11, wherein
the steering circuit performs steering with respect to the at least one of the first wheel and the second wheel based on the first scheduled route and the second scheduled route.

20. The control device according to claim 11, wherein
the vehicle further includes a drive portion configured to drive the at least one of the first wheel and the second wheel.

* * * * *